（12) United States Patent
Waters et al.

(10) Patent No.: US 12,151,133 B2
(45) Date of Patent: Nov. 26, 2024

(54) TIMBER REMEDIATION

(71) Applicant: Treated Timber Remediation Pty. Ltd, Wayville (AU)

(72) Inventors: Peter John Waters, Cheltenham (AU); Timothy Ralston Lang, Pymble (AU)

(73) Assignee: Treated Timber Remediation Pty. Ltd, Wayville (AU)

( * ) Notice: Subject to any disclaimer, the term of this patent is extended or adjusted under 35 U.S.C. 154(b) by 200 days.

(21) Appl. No.: 17/593,652

(22) PCT Filed: Mar. 25, 2020

(86) PCT No.: PCT/AU2020/050283
§ 371 (c)(1),
(2) Date: Sep. 22, 2021

(87) PCT Pub. No.: WO2020/191440
PCT Pub. Date: Oct. 1, 2020

(65) Prior Publication Data
US 2022/0176181 A1    Jun. 9, 2022

(30) Foreign Application Priority Data

Mar. 25, 2019 (AU) .............................. 2019900995
Oct. 23, 2019 (AU) .............................. 2019903985

(51) Int. Cl.
*A62D 3/36* (2007.01)
*B01D 11/02* (2006.01)
(Continued)

(52) U.S. Cl.
CPC ............ *A62D 3/36* (2013.01); *B01D 11/0284* (2013.01); *B01D 11/0288* (2013.01);
(Continued)

(58) Field of Classification Search
CPC .. A62D 3/36; A62D 2101/43; B01D 11/0284; B01D 11/0288; B01D 2011/002;
(Continued)

(56) References Cited

U.S. PATENT DOCUMENTS 5,415,847 A * 5/1995 Robinson .................. B09C 1/02
423/87
8,043,399 B1 * 10/2011 Hse ...................... B27K 5/0055
75/739
(Continued)

FOREIGN PATENT DOCUMENTS

CA    2628642 A1    10/2009
EP    0774330 A1    5/1997
(Continued)

OTHER PUBLICATIONS

Kwon et al., KR-100870907-B1; Process for Isolating and Collecting Chromated Copper Arsenate Treated Wood and Device Using the Same; Machine Translation (Year: 2008).*
International Search Report issued for International Patent Application No. PCT/AU2020/050283, dated Apr. 9, 2020 in 3 pages.
Kazi et al., "Method to recover and reuse chromated copper arsenate wood preservative from spent treated wood", Waste Management, (2006), vol. 26, No. 2, pp. 182-188.

*Primary Examiner* — Sharidan Carrillo
(74) *Attorney, Agent, or Firm* — KNOBBE, MARTENS, OLSON & BEAR LLP

(57) ABSTRACT

Disclosed herein is a method of remediating chromated copper arsenate (CCA) treated timber. Particularly, the method comprises contacting the CCA timber with an oxidative solvent and an acidic solvent which provides remediated timber and a variety of extracts containing amongst other things the metals of concern. One or more of the steps is conducted using continuous counter current extraction (CCE).

25 Claims, 22 Drawing Sheets

(51) Int. Cl.
    *B27K 3/02*         (2006.01)
    *B27K 3/32*         (2006.01)
    *B27K 5/00*         (2006.01)
    *A62D 101/43*     (2007.01)
    *B01D 11/00*     (2006.01)

(52) U.S. Cl.
    CPC .............. *B27K 3/0207* (2013.01); *B27K 3/32* (2013.01); *B27K 5/00* (2013.01); *A62D 2101/43* (2013.01); *B01D 2011/002* (2013.01); *B27K 2240/10* (2013.01); *B27K 2240/15* (2013.01)

(58) Field of Classification Search
    CPC .......... B27K 3/0207; B27K 3/32; B27K 5/00; B27K 2240/10; B27K 2240/15
    See application file for complete search history.

(56) References Cited

U.S. PATENT DOCUMENTS

| | | | | |
|---|---|---|---|---|
| 2004/0225173 A1* | 11/2004 | Lianzhen | ................ | A62D 3/33 423/658.5 |
| 2010/0222626 A1* | 9/2010 | Nakamura | ................ | C12P 7/10 588/249 |

FOREIGN PATENT DOCUMENTS

| | | | | |
|---|---|---|---|---|
| EP | 0866808 B1 | 2/2001 | | |
| JP | H4-357002 A | 12/1992 | | |
| WO | WO-2009124387 A1 * | 10/2009 | ............... | B27K 3/16 |

\* cited by examiner

TIMBER REMEDIATION

This application is the U.S. National Phase under 35. U.S.C. § 371 of International Application PCT/AU2020/050283, filed Mar. 25, 2020, which claims priority from Australian Provisional Patent Application No. 2019900995 filed on 25 Mar. 2019 and Australian Provisional Patent Application No. 2019903985 filed on 23 Oct. 2019, the contents of which are to be taken as incorporated herein by this reference.

TECHNICAL FIELD

The present invention is generally related to a method of chromated copper arsenate (CCA) treated timber remediation. Particularly, the method comprises contacting the CCA timber with an oxidative solvent and an acidic solvent which provides remediated timber and a variety of extracts containing amongst other things the metals of concern. One or more of the steps is conducted using continuous counter current extraction (CCE).

BACKGROUND OF INVENTION

Copper, Chromium, Arsenic (CCA) impregnated timber is timber that has been impregnated with such metals which act as preservatives. It has been produced and widely used globally, both industrially and domestically for many years. Due to the impregnation process, CCA treated timber has been proved to have long term robustness and is safe to use in some domestic purposes. The uses also include industrial uses, such as within vineyards, retaining walls, flooring, structures associated with water, structures in direct contact with the ground and the like.

At the "end of product life" which is often as little as 8 years of use, CCA treated timber becomes waste. The waste can prove to be a difficult issue to manage as the CCA components pose environmental hazards and health risks. Arsenic salts of most oxidation states are highly toxic in low concentrations to most forms of life. Copper salts act as fungicides and are toxic to aquatic animals thus causing wider ecological damage. Furthermore, they can be toxic to higher life forms in high concentration. Chromium salts, particularly at high oxidation state, are carcinogenic and environmentally hazardous.

Each of the metal salts are water soluble enabling them to have high environmental mobility such that leaching can readily occur from stockpiles into surrounding soils, aquifers and the environment at large. Furthermore, burning of such stockpiles can accelerate the spread of metal ions through release of gaseous ions and particulate matter into the atmosphere.

As a result of the above, regulatory bodies around the world have established strict regulations regarding the disposal or stockpiling of CCA treated timber. As such, disposal of CCA treated waste incurs significant logistical issues and costs resulting in growth in untreated stockpiles, particularly in vineyards and similar, high use areas.

It will be appreciated that a need to remediate CCA treated timber exists such that the aforementioned environmental and health concerns are at least partially ameliorated.

A reference herein to other matters referred to as prior art is not to be taken as an admission that the document or matter was known or that the information it contains was part of the common general knowledge as at the priority date of any of the claims.

SUMMARY OF INVENTION

According to a first aspect of the invention there is provided a method of chromated copper arsenate (CCA) treated timber remediation, the method comprising the steps of: contacting the CCA timber with an acidic solvent to provide an acidic extract; contacting the CCA timber with an oxidative solvent to provide an oxidative extract; and separating the contacted timber from the oxidative extract and acidic extract to produce a supernatant and a remediated timber, wherein one or more of the steps are conducted using continuous counter current extraction (CCE).

Without wishing to be bound by theory, it will be appreciated that CCE is an efficient continuous process of which the operational variables can be manipulated to enable extraction of impregnated species, such as chromated copper arsenate preservatives. The skilled artisan will recognise that by using acidic solvents, acidic action can disrupt bonding between species within timber and where the CCA metals are bound which aids in extraction of the metals into the CCE solvent. Many mechanisms of this disruption may be operating, for example by decomplexation. Furthermore, the use of an oxidising solvent can encourage extraction of CCA through oxidation of the metal centres to higher oxidation states. The oxidative action disrupts bonding of the metals to the timber, and to each other. It will be appreciated that a combination of oxidative solvent, acidic solvent and continuous CCE provides an effective means for remediating CCA timber.

It will be further appreciated that extraction of the copper, chromium and arsenic species into the acidic and oxidative solvent extracts produces a combined supernatant comprising copper, chromium and arsenic species as well as remediated timber.

In further embodiments of the invention, contacting the CCA timber with the acidic solvent or contacting the CCA timber with an oxidative solvent is performed sequentially or simultaneously. In further embodiments, separating the oxidative extract or the acidic extract from the contacted timber is performed sequentially or simultaneously.

Further embodiments comprise a step of soaking the CCA timber in a solvent, providing a soak extract. Preferably the soaking is conducted for around 12 to 24 hours. This additional step enables the timber to be wetted which aids in penetration of the oxidising and acidic solvents into the timber. Furthermore, the soak extract can be separated from the soaked timber by any means known to the skilled person. In yet further embodiments, the CCA timber is soaked in an acidic solvent, an oxidative solvent or mixtures thereof.

The skilled person will understand that during CCE extraction the contacting and separating of timber with solvent can happen simultaneously or sequentially. The invention is not intended to exclude the use of non-continuous methods, such as batch processes in combination with CCE. Further the solvent can contain both mixtures of acid and oxidant, or only oxidant or only acid. Furthermore, steps may be included in the process such as contacting and/or separating timber with solvent, which can be non-oxidising and/or non-acidic. Such steps can operate continuously or non-continuously. Any number of such steps and sequences are claimed within the scope of this invention.

Further embodiments of the invention relate to a method further comprising a step of pressing and/or drying the CCA timber, providing a press extract. The pressing step aids in removal of residual solvent from the CCA timber. Drying of the timber renders it more suitable for storage or further processing as the likelihood of spoilage and the weight of the timber is reduced.

In a further embodiment of the invention the acidic solvent is an aqueous mineral acid. It will be appreciated that water is a readily available, environmentally benign solvent to use. The skilled person will recognise that any number of mineral acids can be used in this process. Without wishing to be bound by theory, mineral acids can affect a protic action upon the species within the timber that are bonded to the CCA metals. Thus, aiding in desorption of the species by any number of mechanisms, including decomplexation, ultimately aiding in extraction. Furthermore, the conjugate base of various mineral acids can enhance the solubility of cationic metals such as CCA by forming ion pairs, especially in polar protic solvents such as water, therefore aiding in extraction of such species.

In preferred embodiments of the invention the mineral acid is $H_2SO_4$, this acid being a readily available strong acid. Preferably the $H_2SO_4$ is at a concentration of up to 20% w/v, preferably the concentration is 2% w/v. At this concentration the acid is of sufficient power to perform the extraction to sufficient ability, without incurring the dangers of handling concentrated acids and the associated risks to operators and equipment.

In further embodiments of this invention the oxidative solvent has an oxidising potential suitable to oxidise chromium to the VI oxidation state. Without wishing to be bound by theory, an absorption mechanism for CCA timber involves the chromium VI being reduced to chromium III by reaction with the timber matrix and bonding or forming complexes with organic substrates such as lignins, amino acid residues, sugars or the like. Such bonded chromium sites provide a means for the formation of strong chemical bonds with the copper and arsenic in the CCA formulation. Oxidation of chromium to the VI oxidation state aids in disrupting the bonding between the chromium metal and timber whilst also preventing re-adsorption of the CCA ions into the timber. A further effect is that re-bonding of copper and arsenic to the chromium sites is inhibited. It will be appreciated that any suitable oxidant can be used to provide this result.

In preferred embodiments of the invention the oxidant is aqueous $H_2O_2$, this oxidant being a readily available oxidising agent. Furthermore, the oxidation products associated with $H_2O_2$ are more readily handled that those formed using other oxidations. For example, halogenated oxidants can produce halogenated oxidation products which are often less desirable than oxygenated products. Preferably $H_2O_2$ is present in up to 20% w/v, preferably around at around 1-5% w/v, even more preferably 0.2% to 1% w/v. At this concentration the oxidant is of sufficient power to aid in the extraction, without incurring the dangers of handling concentrated oxidising agents and the associated risks to operators and equipment.

It will be appreciated that the combined effects of oxidative and acidic solvents and by using a continuous CCE provides an effective method of remediating CCA treated timber. The effect of acid and oxidant can also chemically disrupt the timber matrix which in combination with the physical agitation caused by the CCE aids of penetration of the solvent into the timber.

In some embodiments the CCE draught liquid to solid ratio range is about 1:1 to 5:1, preferably about 2:1 to 4:1. This draft ratio is favourable to achieve effective extraction of the impregnated CCA metals. Furthermore, certain embodiments of the invention are such that CCE has a residence time, a screw timing and feed rate sufficient to remove a predetermined amount of chromated copper arsenate.

In a particular set of embodiments, the invention further comprises a washing step, which also provides a wash extract. The wash step provides a further step to aid removal residual solvent, remaining CCA metals and other species from the timber, such as residual acid or oxidant. In some embodiments the wash step is performed with an aqueous solvent, preferably water.

In yet further embodiments the wash step is a conducted under neutralising conditions such that any residual acid is neutralised. The skilled person will recognise that any solution of suitably high pH can be employed to perform this function. Such a solution can include carbonate, hydroxide, bicarbonate, preferably bicarbonate.

In some embodiments of the invention the soaking step or washing step is conducted using continuous counter current extraction. Any method suitable to perform these steps can be used including various non-continuous methods, such as batch methods.

Further embodiments of the invention relate to the oxidative contacting, the acidic contacting, the washing step or the soaking step being conducted at a temperature of about room temperature to 100° C., 30° C. to 90° C., 40° C. to 80° C., preferably about 40° C. to 60° C. Such a temperature is an effective compromise between high temperature, and associated energy input, and evaporative loss.

In a particular set of embodiments, the CCA timber is milled to provide milled timber which aids in physical manipulation characteristics, such as movement through a CCE, and increases surface area thus improving the ability of solvent to contact the timber and extract the CCA metals.

It is to be understood that in a preferred embodiment the milled particles have at least two distinct dimensions, preferably a long dimension, and a short dimension most preferably the long dimension is about 5 mm, and most preferably the short dimension is about 2 mm. Having a long dimension and a short dimension of these lengths provides a short diffusion path and provides effective resistance to flow in the counter current extractor. More preferably, the timber is milled to at least one minimum dimension of 1 to 5 mm, preferably about 2 mm.

In a further set of embodiments, each of the extracts produced by the aforementioned method, comprising one or more of the CCA containing supernatant, the acidic extract, oxidative extract, soak extract, wash extract, or combinations thereof are subjected to further treatment steps. The combined extracts comprise CCA metals, organic compounds, minerals derived from the timber and/or sulphuric acid. The further treatment steps comprise one or more of the following steps:

a) at least partial removal of residual organic compounds;
   b) at least partial removal of suspended solid; and/or
   c) at least partial concentration, to produce a CCA containing liquid.

Removal of the any residual organic compounds can be achieved by any means familiar to a skilled person. Such means include addition of activated carbon. Removal of residual suspended solids can be achieved by any means familiar to a skilled person, such as by ultrafiltration. Concentration may be achieved by any technique familiar to a skilled person such as nanofiltration, reverse osmosis, dense-membrane filtration, evaporation or combinations thereof.

The copper, chromium and arsenic (CCA) containing liquid can be used as a feedstock in the treatment of timber by re-impregnation to act as a preservative. Therefore, recycling the extracted copper, chromium and arsenic, and preventing storage of toxic waste and aiding in delivering a cyclic process whereby the total amount of copper, chromium and arsenic entering the environment is stabilised.

It will be appreciated that the ability to recover and reuse the solvent and sulphuric acid reduces the waste generated by this method. Furthermore, recovery of the organics and carbon can find use as feedstock for other uses, for example a fertilizer.

The remediated timber can find use in energy generation, as feedstock for building material, paper manufacture, or pyrolyzed to produce activated carbon, wood oil and/or wood vinegar for example.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

It will be convenient to hereinafter describe the invention in greater detail by reference to the accompanying drawings. The detailed description and the drawings are however merely illustrative of how the invention might be put into effect, so that the specific form and arrangement of the various features as shown is not to be understood as limiting on the invention.

Further aspects of the invention appear below in the detailed description of the invention.

DETAILED DESCRIPTION

CCA Timber

Figure 1:
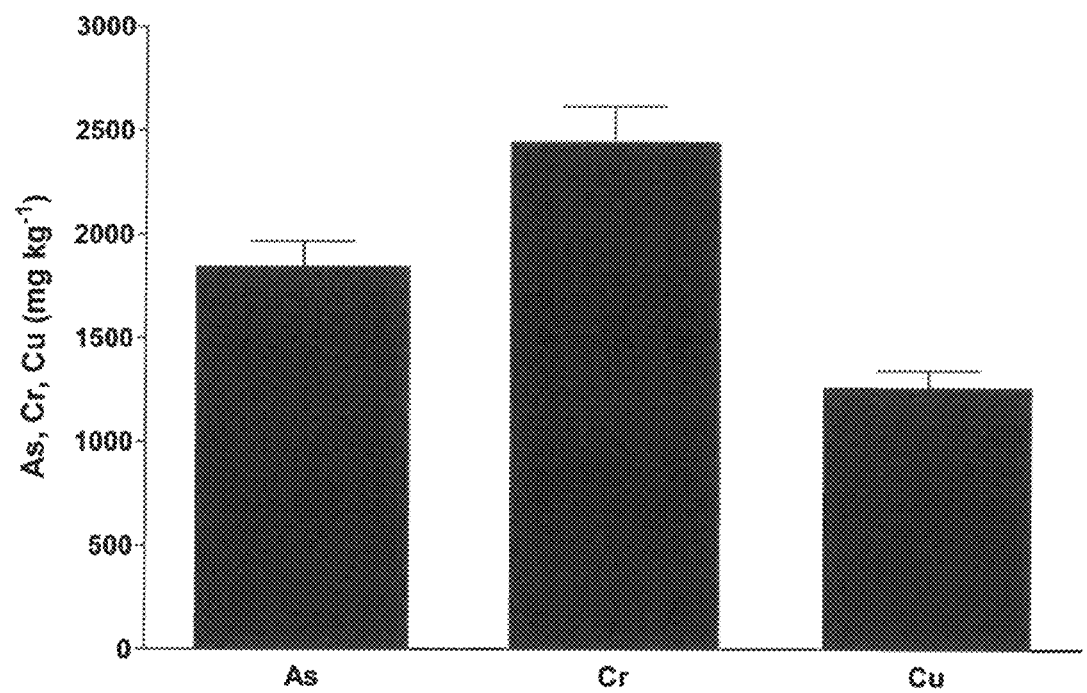
FIG. 1 is a graphical representation of the concentration of Cu, Cr and As in CCA woodchips. Bars present the mean and standard deviation of 6 replicates.

The first aspect of the invention relates to method of chromated copper arsenate treated timber remediation. CCA is produced by impregnating timber with an aqueous solution of copper, chromium and arsenic ions. A typical solution can contain up to 25% copper, up to 45% chromium and up to 37% arsenic. According to some estimates, CCA makes up about 1% of the timber volume. The treatment makes the timber resistant to spoilage by animal pests, fungi and other plant based damaged. As such CCA timber finds widespread use in areas such as landscaping, building poles, jetty piles or fencing. However, it can also be toxic when handled, burnt, and leaching of the metals over time causes ecological damage. This effect is enhanced when large amounts of used waste timber is stockpiled in a confined area.

It has been reported that the mechanism for the absorption of chromated copper arsenate (CCA) into wood involves the chromium (VI) being reduced to chromium (III) by reaction with the wood matrix and in the process bonding to the lignins and/or cellulose in the wood matrix. These bonded chromium sites provide a means for the formation of strong chemical bonds with the copper and arsenic in the CCA formulation. During leaching trials with dilute mineral acids (for example 2% sulphuric acid) it was noted that the removal of chromium (and to a lesser extent copper and arsenic) reached a plateau beyond which further removal became problematic.

Without wishing to be bound by theory it has been postulated that the chromium (after leaching) was being reabsorbed into the CCA timber matrix prior to diffusion out of the wood chips. This re-adsorption in turn provided reaction sites for the re-bonding of copper and arsenic to the wood. It was further postulated that addition of an oxidant to the extraction solvent would assist in maintaining the chromium in the VI oxidation state and prevent re-bonding to the timber matrix as chromium III. Further, this would prevent re-bonding of copper and chromium to the chromium sites. It was further postulated that addition of an oxidant to the extraction solvent would assist in maintaining the chromium in the VI oxidation state and prevent re-bonding to the wood matrix as chromium in the III oxidation state.

Acidic Solvent

The skilled person will appreciate that any suitable acid capable can be used in this method. For example, mineral acids, organic acids and their derivatives, such as carboxylic acids. Preferably the acid is a mineral acid, for example, hydrochloric acid HCl, nitric acid $HNO_3$, phosphoric acid $H_3PO_4$, sulfuric acid $H_2SO_4$. Preferably the acid can form an aqueous solution. Most preferably the acid is $H_2SO_4$.

$H_2SO_4$ can be used at a concentration of up to 20% w/v, up to 15% w/v, up to 10% w/v, up to 5% w/v, most preferably 2% w/v.

Oxidative Solvent

The skilled person will appreciate that any suitable oxidant can be used in this method. For example, such oxidants include: ozone $O_3$, hydrogen peroxide $H_2O_2$ and other peroxides, Fenton's reagent, nitric acid $HNO_3$ and nitrate compounds, peroxydisulfuric acid $H_2S_2O_8$, peroxymonosulfuric acid $H_2SO_5$, chlorite, chlorate, perchlorate, and other analogous halogen compounds, hypochlorite and other hypohalite compounds, including household bleach NaClO, permanganate compounds such as potassium permanganate, sodium perborate, potassium nitrate $KNO_3$. Preferably the oxidising agent can form an aqueous solution. Most preferably the oxidising agent is $H_2O_2$.

$H_2O_2$ can be used at a concentration of up to 20% w/v, up to 15% w/v, up to 10% w/v, preferably up to 5% w/v, most preferably up to 2% w/v, about 1-5% w/v, preferably 0.1% to 2% w/v, more preferably 0.2 to 1% w/v.

Furthermore a solvent having a combination of up to 20% w/v acid and 20% oxidant can be used, preferably up to 2% w/v acid and up to 5% w/v oxidant, more preferably a combination of up to 2% w/v $H_2SO_4$ and up to 5% w/v $H_2O_2$ is used, most preferably a combination of 1% w/v $H_2O_2$ and 2% w/v $H_2SO_4$ is used.

Remediated Timber

Without wishing to be bound by theory, several jurisdictions have issued directions with respect to target residual concentration of chromium, copper and arsenic in remediated timber. Each of the following targets are disclosed as possible residual metal levels by way of example only and are not intended to limit the invention to a particular level of remediation. Such residue targets can depend on the following:

a. The regulations in the jurisdiction into which the remediated timber will be transferred; and
b. The product specifications of the end user of the remediated timber.

For example in the European Union there is a regulated limit for these elements in wood, that is, if the concentrations are less than 2 mg/kg for arsenic, 30 mg/kg for chromium and 20 mg/kg for copper the wood is no longer a regulated product and can be used for any suitable purpose. With the exception of the European Union, no jurisdiction has published a definition of "clean" or "remediated" timber with respect to arsenic, chromium and copper.

In Australia, each State jurisdiction has a different approach. For example, in South Australia waste CCA treated timber is classified as a listed waste, therefore any product derived from CCA treated timber will be treated as an industrial waste stream often requiring Environmental Auditor sign off on each application on a case by case basis. The South Australian regulatory framework does not allow for blanket approvals or exemptions. Such limitations would apply to compost and mulch end use options. However, for reuse as a feedstock for particle board manufacture by way of example, the receiver or end user and the remediator or supplier needs to establish a product specification and a SA-EPA approved resource recovery plan needs to be implemented.

In New South Wales and some other jurisdictions, it is possible to get an exemption (from restricted use of CCA treated timber) for remediated timber with less than a specified concentration of arsenic, chromium and copper. The specification must be proposed and accepted by the regulator and end users prior to any exemption being granted. An example of this approach is for the Used Foundry Sand Exemption in New South Wales.

In the United States, end use is regulated by both the Federal EPA and state regulators. Approval for any particular use is based on a scientifically based risk assessment. The United Stated regulators rely heavily on the leachability of potential contaminants when undertaking any approval process. The nature of the proposed remediation process would result in low leachability of metals in any final product.

It will be appreciated that the level of remediation of timber varies between jurisdiction and purpose. An advantage of the remediation methodology discussed herein is that the process can be adjusted to achieve any desired residual arsenic, chromium and copper concentration required by the end user or the regulator.

Table 1 provides a list of exemplary limits relevant to remediated CCA treated timber.

TABLE 1

CCA Regulatory Limits.

| Jurisdiction | Context | Arsenic mg/kg | Chromium mg/kg | Copper mg/kg |
|---|---|---|---|---|
| EU Directive | Wood waste ceases to be regulated | 2 | 30 | 20 |
| AS 4454 | Soils and mulches | 20 | 100 | 150 |
| SA-EPA | Waste derived fill[1] | 20 | $400^2/1^3$ | 60 |
| SA-EPA | Biosolids in unrestricted compost[4] | NR[5] | 1[6] | 100 |
| SA-EPA | Compost[7] guideline | 20 | 100 | 150 |

[1]The Waste Derived Fill limits are often used in South Australia as a benchmark for reuse options. For example, generally these are the limits applied to compost feedstock derived from industrial waste;
[2]Chromium (III) limit, chromium retained within the wood will be this form;
[3]Chromium (VI) limit;
[4]The biosolids guideline is intended for materials of "natural" origin. It should not be applied to industrial or listed waste used as compost feedstock. The same comment applies to the limits listed in AS4454. However, similar arguments may be used to relate these limits to an industrial wastes;
[5]Arsenic is not regulated on the basis that it is not found in typical biosolids at concentrations above that of natural soil;
[6]Chromium (VI), chromium (III) is not regulated on the basis that it is not found in typical biosolids at concentrations above that of natural soil;
[7]The compost guideline represents the limit for compost products. Under the South Australian regulatory framework this limit would be applied to any natural feedstock. However, it is not applicable to feedstock derived from industrial or listed waste.

Soaking Step

The soaking step is intended to infuse the effectively dry wood chips with the acid and/or oxidative solution used in the extraction step. This optional step helps ensure that reagents used in the extraction step are not depleted by absorption into effectively dry wood chips and assists with the dynamics and execution of the extraction step. The soaking step may be undertaken as a batch process or as an additional CCE process prior to the extraction CCE. The soaking step can be conducted for up to 24 hours, up to 18 hours, up to 12 hours, or up to 6 hours. The soaking step can be conducted at up to 100° C., up to 90° C., at up to 80° C., at up to 70° C., at up to 50° C., at up to 40° C., at up to 30° C., or at room temperature.

Washing Step

The purpose of the optional washing step is to remove excess extraction solution from the remediated wood chips.

Depending on the target end use market for the remediated wood chips the washing reagent can be water, a neutralising solution or another reagent suitable to impart a desired property to the remediated wood chips.

The washing step can be conducted for up to 24 hours, up to 18 hours, up to 12 hours, or up to 6 hours. The washing step can be conducted at up to 100° C., up to 90° C., at up to 80° C., at up to 70° C., at up to 50° C., at up to 40° C., at up to 30° C., or at room temperature.

Pressing Step

After the previous steps the remediated wood chips are saturated with wash solution. This absorbed solvent adds significant weight to the remediated product and could also result in degradation of the product due to microbial, fungal or other biological or chemical process during storage or transport.

The incorporation of an optional pressing step in which the remediated wood chips undergo mechanical pressing to partially remove absorbed and interstitial solvent will help mitigate these potential problems and reduce the energy consumption (and hence cost) of the drying step.

Drying Step

The remediated wood chips will be saturated with the wash reagent which in most implementation of the invention will be an aqueous or water based reagent. To facilitate storage, transport and handling the remediated wood chips can be dried. The drying process can be any process that will remove the bulk of the washing reagent. This can include any suitable method, including air drying at elevated temperature, freeze drying, supercritical solvent drying or other technology.

The optional drying step is intended to reduce the weight of the remediated wood chips, mitigate degradation by microbial, fungal or other biological processes and facilitate cost effective handling, storage and transport.

CCE Extraction

The CCE is a liquid/solid contacting device where the liquid and solid phases flow counter current. One of the key functions of this device is to recover compounds which are soluble in the liquid phase from the solid phase, known in the art as a diffusor extractor. This particular device is differentiated from other Diffusion Extractors by low shear and hence maintains the integrity of particles in the solid phase. The solid phase is progressed using a single screw with intermittent reversal and the liquid counterflow by adjusting head. The performance of the CCE is governed by eight operating variables: Draft, Temperature, Feed Rate, Preparation of feed (diffusion path), Angle, Residence time, Cycles per Residence time, Rotational Speed. Each of these variables can be manipulated by the user. The very high efficiency of this device (10-14 mathematical stages) provides high yields at low dilution.

The CCE draught liquid to solid ratio can be in the range of 1:1 to 10:1; 1:1 to 5:1; preferably about 2:1 to 4:1.

The CCE has a residence time 40-100 minutes, 60-90 minutes, preferably 70 to 88 minutes and a screw motion of 250-600 cycles per residence time, and a feed rate of about 2,500 kg/hour.

As stated in a preferred embodiment, the CCA timber can be into milled particles that have at least two distinct dimensions. A long dimension of up to 30 mm, up to 20 mm, up to 10 mm, up to 5 mm, up to 2 mm, preferably 5 mm. A short dimension of up to about 10 mm, up to 5 mm, up to 2 mm, preferably about 2 mm. Most preferably a combination of long dimension of about 5 mm and a short dimension of 2 mm is used. More preferably, the timber is milled at least one minimum dimension of 1 to 5 mm, preferably about 2 mm.

The CCE can be conducted at up to 100° C., up to 90° C., at up to 80° C., at up to 70° C., at up to 50° C., at up to 40° C., at up to 30° C., or at room temperature.

"Draft" refers to the level (mass) of liquid phase relative to the level of solid phase entering the CCE.

"Angle" refers to the angle of the trough of the CCE relative to horizontal. Angle determines the head driving the liquid phase through the solid phase.

"Residence time" refers to the time elapse between solid phase entering the CCE at the lower end and exiting at the higher end.

"Particle Size Distribution" determines both diffusion path (shortest dimension) and resistance to flow (number of stages).

"Cycles" refers to time interval between intermittent reversal of the screw conveying the solid phase "Ultra-filtration" or "ultrafiltration" refers to filtration with use of any semi-permeable membrane having a pore size of 0.01 to 0.10 microns.

"Micro-filtration" or "microfiltration" refers to filtration with use of any semi-permeable membrane having a pore size of 0.10 to 10.0 microns "Nano-filtration" or "nanofiltration" refers to filtration with use of any semi-permeable membrane having a pore size of 90 Daltons-400 Daltons.

"Activated carbon" refers to refers to any form of carbon having suitable properties for adsorption of organic chemical species, including activated charcoal, biochar and the like.

Recovery of CCA Metals

A further set of embodiments relates to one or more of the extracts produced by the aforementioned method, comprising the CCA containing supernatant, the acidic extract, oxidative extract, soak extract, wash extract, or combination thereof being subjected to further treatment steps.

The combined extracts comprise one or more of CCA metals, organic compounds, minerals derived from the timber and sulphuric acid. The further treatment steps can comprise one or more of the following steps: a) at least partial removal of residual organic compounds; b) at least partial removal of suspended solid; or c) at least partial concentration, to produce a CCA containing liquid. The CCA containing liquid can be used as a feedstock to treat new timber.

Figure 21:
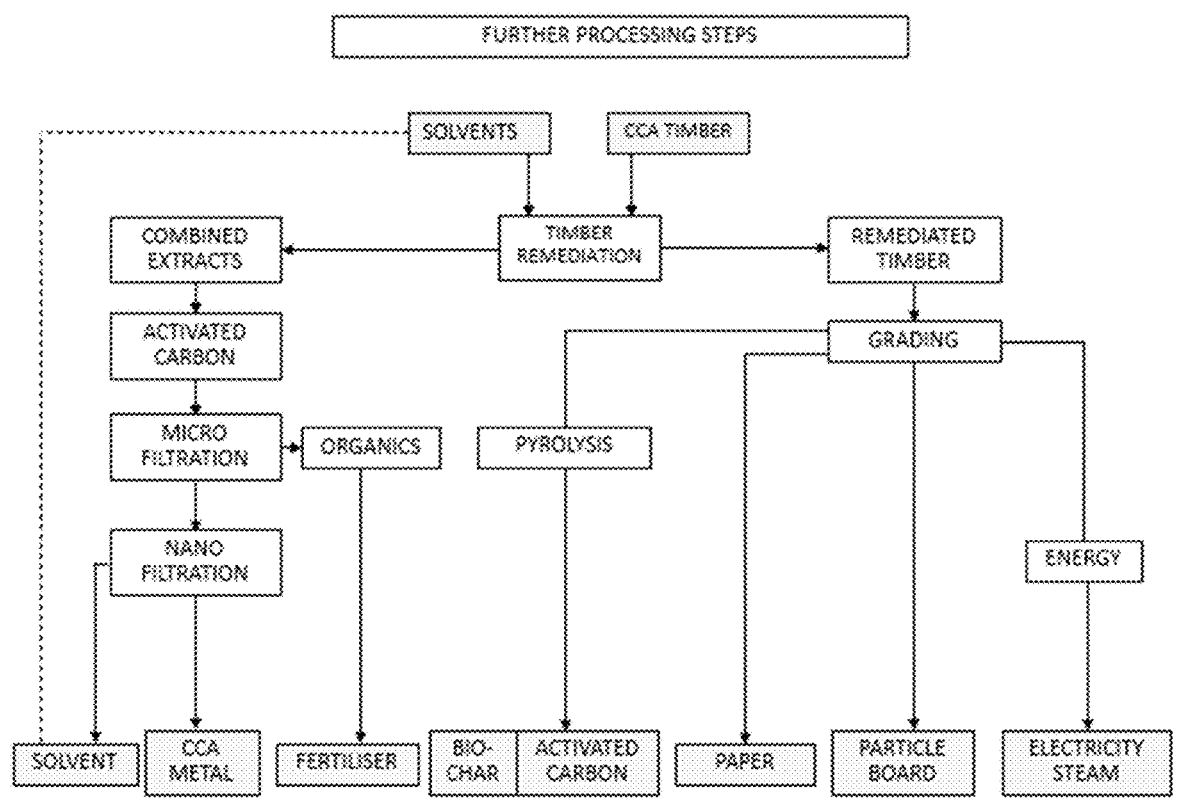
FIG. 21 a schematic representation of the embodiments of invention which relate to further processing steps conducted on the combined extracts and remediate timber. Also shown are some possible uses for the various products of the method. The dotted line represents recycled solvent.

In particularly preferred embodiments, as shown in FIG. 21, the steps are conducted sequentially in the order a), b) to c). Most preferably the removal of the any residual organic compounds is conducted by addition of activated carbon. Removal of residual suspended solids is conducted by ultrafiltration and concentration is conducted by nano-filtration, evaporation or a combination thereof.

A skilled person will recognise that means of organic compounds extraction include but are not limited to additions of adsorbents, such as activated carbon, precipitation, trituration and combinations thereof.

Removal of residual solids can be conducted by filtration, ultrafiltration, centrifugation, decantation and combinations thereof.

Concentration can be conducted by the following methods evaporation, evaporation under reduced pressure, nano-filtration, reverse osmosis, dense-membrane filtration and combinations thereof, for example.

EXAMPLES

Determination of the Efficacy of Cu, Cr and as Removal from CCA Timber, the Impact of Nature and Amount of Acidic Solvent, Impact of Nature and Amount of Oxidant Solvent, Temperature, Pre-Extraction Soaking and Extraction Solution on Cu, Cr and as Removal Leaching experiments were conducted at bench scale as a proof of concept, in a temperature controlled environment set to 50° C. Leaching solvent was pumped through the column (bottom up flow) using a peristaltic pump at the desired flow rate. For leaching trials 1 and 2, woodchips were screened to <8 mm while for trial 3, woodchips <5 mm in size were utilized. When quantifying the total concentration of Cu, Cr and As in CCA treated timber as woodchips pre- and post-leaching, one bed volume of woodchips (350 g) were ground and representative subsamples (n=6) digesting using USEPA method 3051 (microwave assisted aqua-regia digest). Column leachates and aqua-regia digests were filtered (0.45 □m cellulose acetate filters), diluted with 0.1 M nitric acid and analysed using Inductively Coupled Plasma Optical Emission Spectroscopy (ICP-OES) or Mass Spectrometer (ICP-MS).

Soaking

A prepared bed of chipped material (approximately 1.5 litres of known weight) covered with a soak liquid ($H_2SO_4$ or 5% $H_2O_2$) until chips were fully immersed (and remained so). The water take-up of the chips was measured on a time bases and temperature. The soak liquid was recycled for 24 hours at 2-3 Bed Volumes (BV)/hour.

This procedure ensured contact between the metal-timber bond and the reagent in the soak liquid, and the start of diffusion of freed metals from the solid to the liquid phase along a concentration differential. Recycling of the soak liquid maximized this concentration differential over the period of the soak. Note that the wood chips absorbed up to four bed volumes of the soak solution, the total volume of soak solvent added was recorded. Prior to the wash step the bed was drained and the volume of recovered solvent recorded. A sample was collected for analysis (Cu, Cr and As) [liquid test sample 1].

Washing

In each trial the soak was followed by a wash. This procedure was intended to flush out most of the metals in the liquid phase at the end of the soak. Wash volume of 1.5 litres (or 1 BV) was circulated at a rate of 2 BV/hour. The exact volume of wash solvent added and recovered was recorded. The recovered wash solution were combined, mixed and a sample collected for analysis (Cu, Cr and As) [liquid test sample 2].

Extraction

The extraction was performed with 3 litres (2 BV) of $H_2SO_4$ at a rate of 1.5 litres (1 BV) per hour. Note: it was especially important to take a "last off" sample for analysis. The extract sample was collected, mixed and sampled for analysis (Cu, Cr and As) [liquid samples]. Addition samples were collected for analysis (Cu, Cr and As) for initial break through, 0.5BV, I. 0BV, 1.5BV and 2.0BV [liquid samples 3A, 3B, 3C and 3D]. Note that as this was done the volume of each sample collected was recorded to enable a mass balance. The last sample in this series is what has been referred to as the "last off" sample.

Post Extraction Washing

The bed was washed with 3 litres of water at a rate of 3 litres (2 BV) per hour. Each half bed volume was collected, mixed and sampled for analysis (Cu, Cr and As) [liquid samples 4A, 4B etc.]. Note that it was important that all collected volumes be accurately recorded so that a mass balance can be undertaken.

Concentration of Cu, Cr and as in CCA Treated Timber

Following grinding of screened (<8 mm) CCA timber woodchips (350 g), the total concentration of Cu, Cr and As was determined using ICP-OES following aqua-regia digestion. Six samples were analysed from ground material to obtain a representative concentration of elements of interest in the bulk sample. As detailed in FIG. 1, some variability in Cu, Cr and As concentration was observed between samples with total concentrations (±standard deviation) of 1260±85 mg Cu $kg^{-1}$, 2442±175 mg Cr $kg^{-1}$ and 1836±131 mg As $kg^{-1}$.

CCA Leaching Trials 1 (Acidic Solvent) and 2 (Oxidative Solvent)

Leaching Trial 1—Acidic Solvent

CCA timber woodchips were soaked in 2% recirculating $H_2SO_4$ for 24 hours after which woodchips were washed with water (10 bed volumes). During the extraction phase (2% $H_2SO_4$), leachate samples were collected after 2, 4, 6, 8, 10 and 20 bed volumes to determine extraction longevity/efficacy. Following extraction, residual 2% $H_2SO_4$ was removed with 10 bed volumes of water after which woodchips were recovered, dried, ground and analysed for residual Cu, Cr and As.

Acidic Trial 1—Leaching Solvents:
 a. Soak: 2% $H_2SO_4$ (4 L reservoir); 24 h recirculating;
 b. Wash: Water (4 L reservoir); 10 bed volumes (BV);
 c. Extraction: 2% $H_2SO_4$ (4 L reservoir); 20 BV; and
 d. Final Wash: Water (4 L reservoir); 10 BV.

Oxidative Leaching Trial 2

2% $H_2O_2$ was recirculated in place of $H_2SO_4$ in the soak step as per trial 1 for 24 hours after which CCA timber woodchips were washed with water (10 bed volumes). During the extraction phase (2% $H_2SO_4$), leachate samples were collected after 2, 4, 6, 8, 10 and 20 bed volumes to determine extraction longevity/efficacy. Following extraction residual 2% $H_2SO_4$ was removed with 10 bed volumes of water after which woodchips were recovered, dried, ground and analysed for residual Cu, Cr and As.

Trial 2—Leaching Solvents
 a. Soak: 2% $H_2O_2$ (4 L reservoir); 24 h recirculating;
 b. Wash: Water (4 L reservoir); 10 BV;
 c. Extraction: 2% $H_2SO_4$ (4 L reservoir); 20 BV; and
 d. Final Wash: Water (4 L reservoir); 10 BV.

Glass wool was added to the column at the bottom and top of 350 g (1.5 L) of CCA wood chips. Solutions (1: soak; 2: wash; 3: extraction; 4: wash) were pumped through the column via the bottom inlet from a 5 L reservoir using a peristaltic pump external to the oven (50° C.). Once 2 bed volumes was achieved, the solution was recirculated to the reservoir via the column outlet. At the end of the treatment process, CCA wood chips were removed, oven dried (GOT) then digested to determined residual Cu, Cr and As. Initially, CCA wood chips were screened to 8 mm for leaching experiments. The total concentration of Cu, Cr and As in wood chips was determined after grinding 350 g of wood chips and digesting (microwave assisted [USEPA 3051] aqua-regia digests) representative subsamples (n=6).

Cu, Cr and As Extraction

Figure 2:
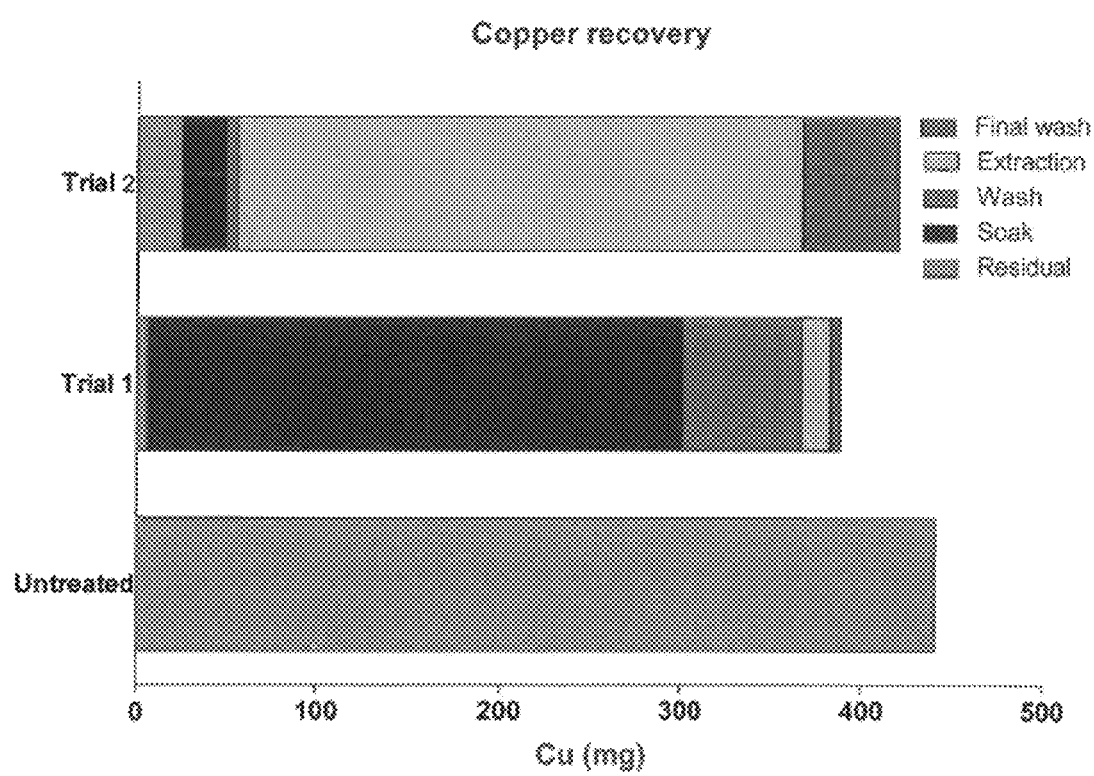
FIG. 2 is a graphical representation of the concentration of recovery of Cu from CCA leaching trial 1 ($H_2SO_4$ soak) and trial 2 ($H_2O_2$ soak).
Figure 3:
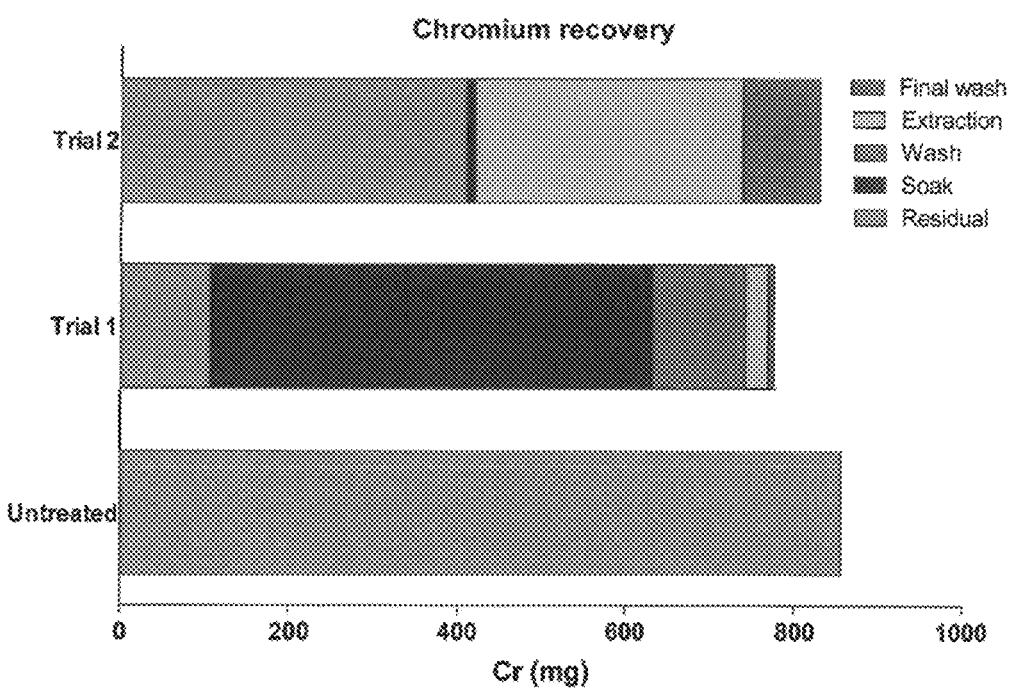
FIG. 3 is a graphical representation of the concentration of recovery of Cr from CCA leaching trial 1 ($H_2SO_4$ soak) and trial 2 ($H_2O_2$ soak).
Figure 4:
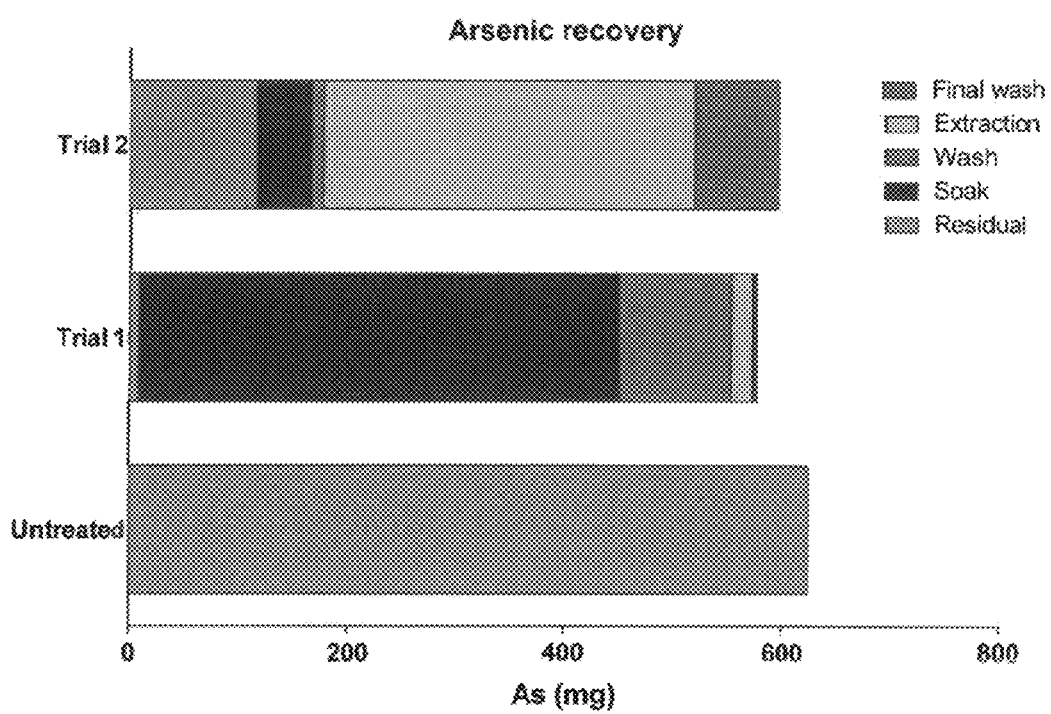
FIG. 4 is a graphical representation of the concentration of recovery of As from CCA leaching trial 1 ($H_2SO_4$ soak) and trial 2 ($H_2SO_4$ soak).

FIGS. 2-4 show the recovery of Cu, Cr and As from woodchips following leaching trials 1 and 2. In acidic solvent trial 1, the majority of Cu was recovered during the $H_2SO_4$ soak (295 of 441 mg); the extraction phase (20 bed volumes) only recovered a further 16 mg. In contrast, the majority of Cu (311 mg) was recovered from the $H_2SO_4$ extraction phase (20 bed volumes) during oxidative trial 2, due to the initial $H_2O_2$ soak. Thus demonstrating the efficacy of a combination of oxidative and acidic solvent. At the end of the treatment process, a mass balance could account for 88.0% and 95.3% of Cu from leaching trials 1 and 2 respectively. Residual Cu in the wood chips at the end of the treatment process was 18.0±0.6 mg $kg^{-1}$ and 72.6±4.7 mg $kg^{-1}$ (n=5) for trials 1 and 2 respectively.

As with Cu, the majority of Cr during acidic trial 1 was recovered during the $H_2SO_4$ soak (525 of 855 mg); the extraction phase (20 bed volumes) only recovered a further 27 mg. In contrast, the majority of Cr (318 mg) was recovered from the $H_2SO_4$ extraction phase (20 bed volumes) during oxidative trial 2. At the end of the treatment process, a mass balance could account for 90.7% and 97.0% of Cr from leaching trials 1 and 2 respectively. Residual Cr in the wood chips at the end of the treatment process was 306±22.5 mg $kg^{-1}$ and 1173±109 mg $kg^{-1}$ (n=5) for trials 1 and 2 respectively.

In leaching trial 1, the majority of As was recovered during the $H_2SO_4$ soak (440 of 643 mg); the extraction phase (20 bed volumes) only recovered a further 20 mg. In contrast, the majority of As (342 mg) was recovered from the $H_2SO_4$ extraction phase (20 bed volumes) during trial 2. At the end of the treatment process, a mass balance could account for 92.3% and 95.6% of As from leaching trials 1 and 2 respectively. Residual As in the wood chips at the end of the treatment process was 26.0±1.5 mg $kg^{-1}$ and 330±59.4 mg $kg^{-1}$ (n=5) for trials 1 and 2 respectively.

Figure 5:
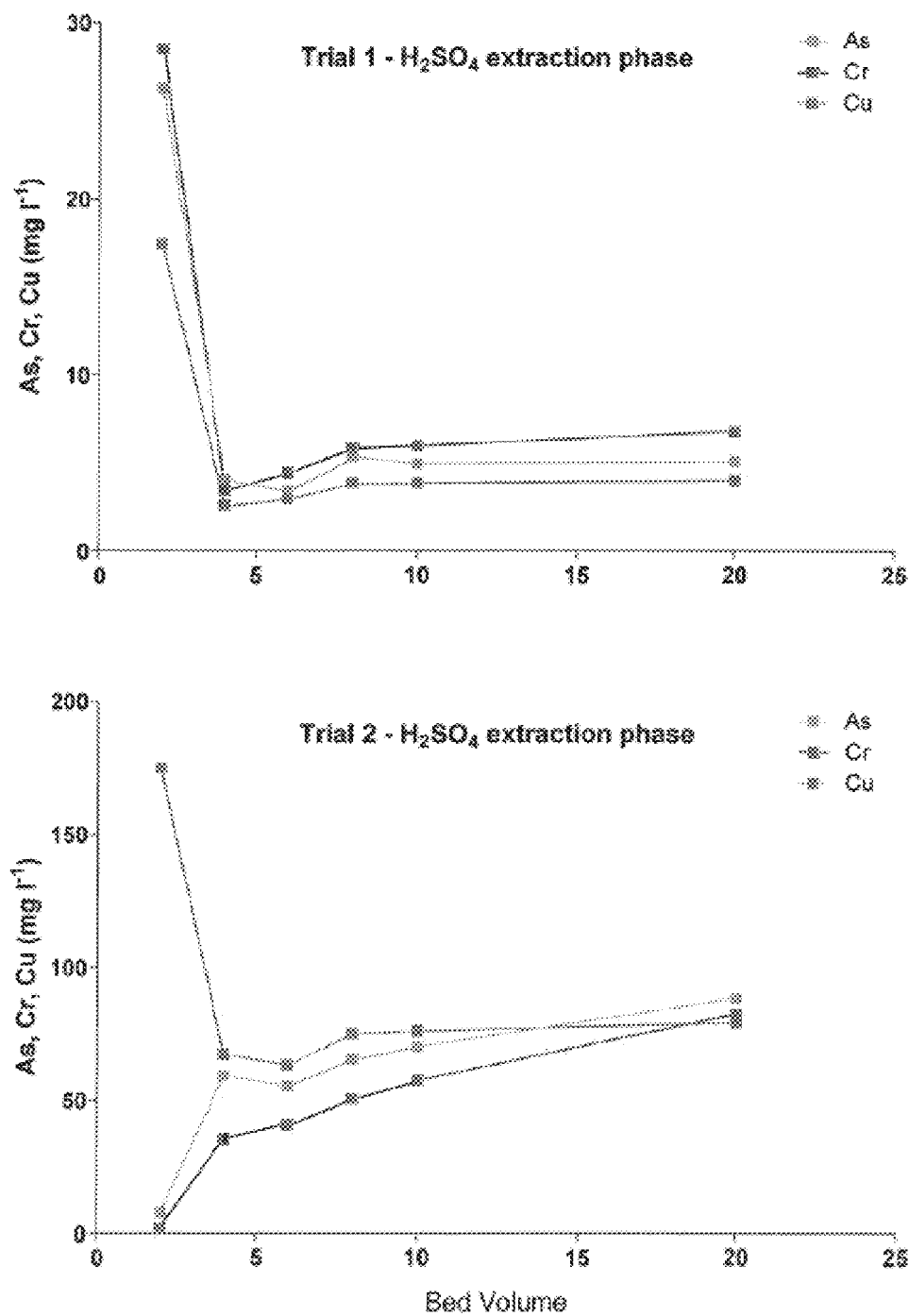
FIG. 5 is a graphical representation of the change in effluent corresponding to As, Cr and Cu concentrations during the 20 bed volume extraction phase (2% $H_2SO_4$).

FIG. 5 details the removal of Cu, Cr and As during the extraction phase of Trials 1 and 2. Significant differences were observed in the extraction profiles from Trial 1 and 2 driven by the initial soak and wash phases. In Trial 1, the $H_2SO_4$ soak and wash phases removed 82.0, 74.3 and 84.4% of Cu, Cr and As compared to 7.0, 1.1 and 9.5% respectively following $H_2O_2$ treatment. Correspondingly, higher concentrations of extraction phase Cu, Cr and As were observed in Trial 2 following $H_2SO_4$ contact with CCA treated timber woodchips. Thus demonstrating the efficacy of using both oxidative and acidic solvents in the extraction process.

CCA Leaching Trial 3

For leaching Trial 3, leaching conditions were changed to represent a flow through system (i.e. no solvent recirculation). Solvent exiting the outlet was collected and analysed on a routine time basis (every hour, equivalent to ~2 bed volumes). Glass wool was added to the column at the bottom and top of 350 g (1.5 L) of CCA timber as woodchips. The initial phase of the treatment (woodchip soak with 2% $H_2SO_4$) was performed under static conditions for 24 h. After the $H_2SO_4$ soak, solutions (2: wash; 3: extraction; 4: wash) were pumped through the column via the bottom inlet from a 10 L reservoir using a peristaltic pump external to the oven (50° C.). 10 bed volumes of solvent were passed through the column for each of the phases (i.e. wash, extraction and final wash). Solvent exiting the column was collected for analysis. At the end of the treatment process, woodchips were removed, oven dried (60° C.) then digested to determined residual Cu, Cr and As. Wood chips were screened to 6 mm for Trial 3 leaching experiments.

Concentration of Cu, Cr and as in Timber as Woodchips

Figure 6:
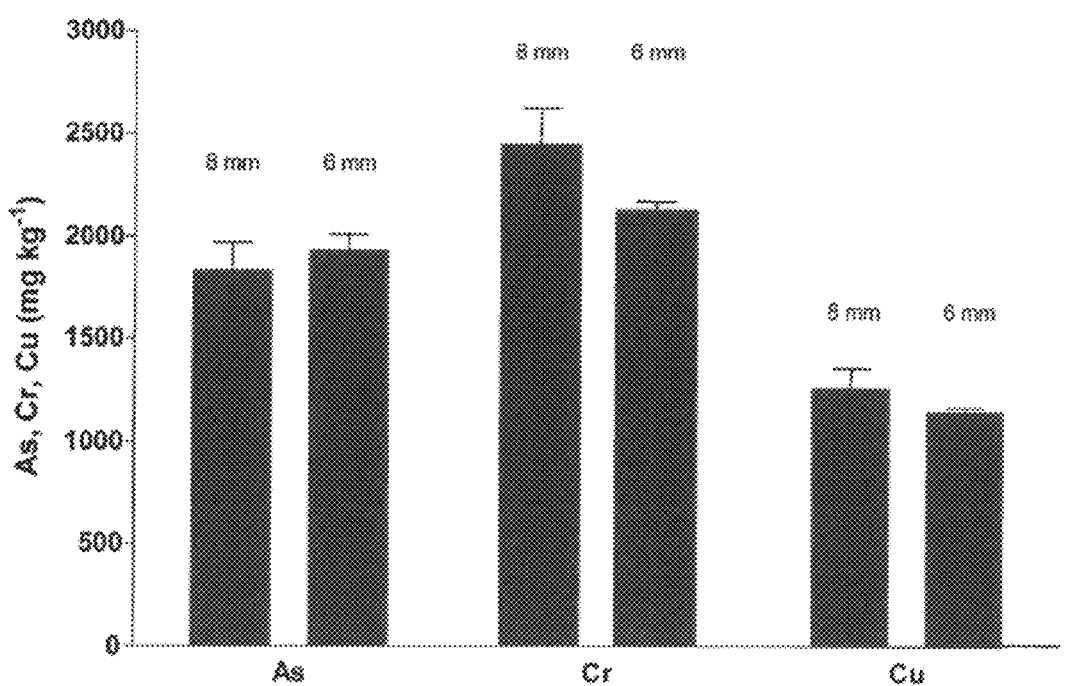
FIG. 6 is a graphical representation of the concentration of Cu, Cr and As in CCA timber as woodchips.

Following grinding of screened (<6 mm) woodchips (350 g), the total concentration of Cu, Cr and As was determined using ICP-OES following aqua-regia digestion. Six samples were analysed from ground material to obtain a representative concentration of elements of interest in the bulk sample. As detailed in FIG. 6, some variability in Cu, Cr and As concentration was observed between samples with total concentrations (±standard deviation) of 1145±21 mg Cu $kg^{-1}$, 2120±42 mg Cr $kg^{-1}$ and 1930±71 mg As $kg^{-1}$. There was no significant difference (P>0.05) in the concentration of As and Cu between woodchip particle sizes, however, low Cr concentration were observed in the <6 mm size fraction which may be due to woodchip heterogeneity.

Trial 3 Recovery of Cu, Cr and As

Figure 7:
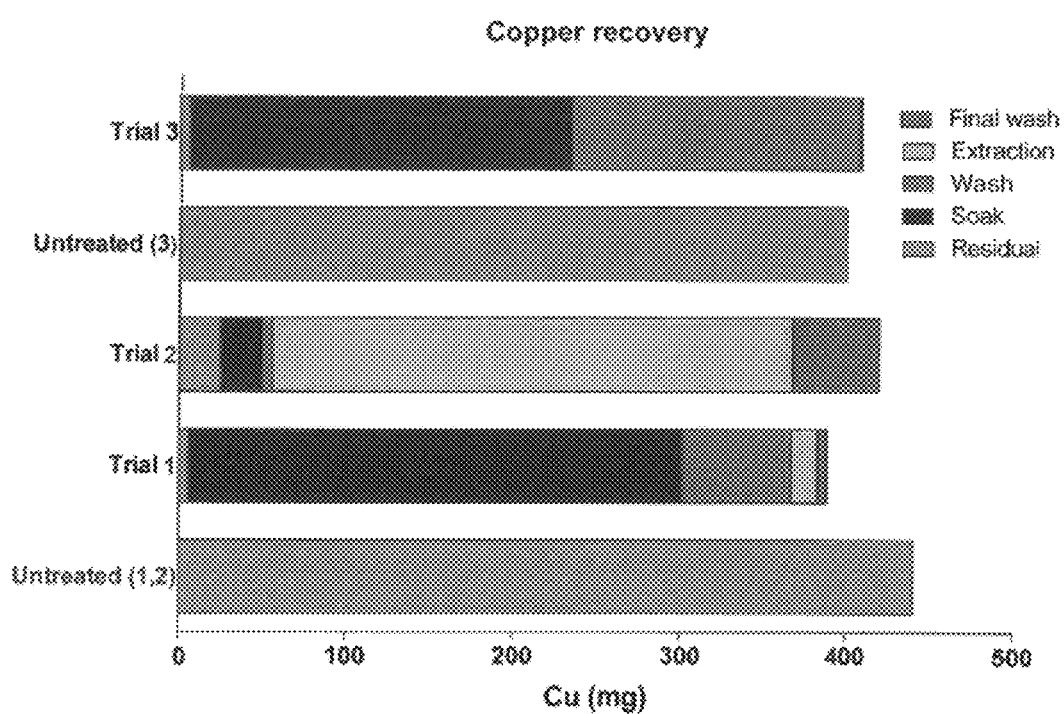
FIG. 7 is a graphical representation of the recovery of Cu from CCA leaching trial 1 ($H_2SO_4$ soak) and leaching trial 2 ($H_2O_2$ soak) using a recirculating system and trial 3 using a static soak and flow through wash/extraction.

Table 2 details the volume of solvent recovered from leaching Trial 3 from each of the 4 leaching phases. Trial 1, the majority of Cu was recovered during the $H_2SO_4$ soak (295 of 441 mg); the extraction phase (20 bed volumes) only recovered a further 16 mg. In contrast, the majority of Cu (311 of 441 mg) was recovered from the $H_2SO_4$ extraction phase (20 bed volumes) during Trial 2. For leaching Trial 3, a tower proportion of Cu was recovered following the static $H_2SO_4$ soak (228 of 401 mg; 56.9%) compared to the recirculating approach (Trial 1), however, the following wash phase recovered 174 mg of Cu (43.4%; FIG. 7). Further extraction and washing of the woodchips recovered only 1.2 mg of Cu (0.3%). Residual Cu in remediated woodchips at the end of the treatment process was similar to Trial 1 (18.0±0.6 mg $kg^{-1}$ versus 17.3±6.9 mg $kg^{-1}$; n=5) but significantly lower compared to Trial 2 ($H_2O_2$ soak; 72.6±4.7 mg $kg^{-1}$).

Figure 8:
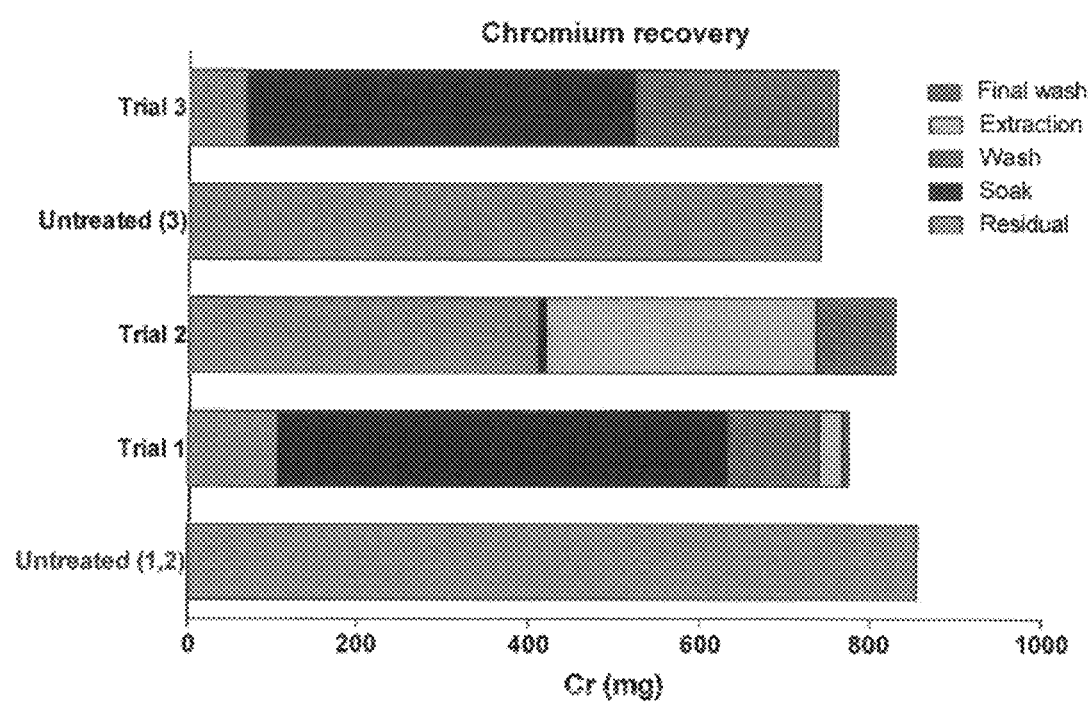
FIG. 8 is a graphical representation of the recovery of Cr from CCA leaching trials 1 ($H_2SO_4$ soak) and trial 2 ($H_2O_2$ soak) using a recirculating system and trial 3 using a static soak and flow through wash/extraction.

In Trial 1, the majority of Cr was recovered during the $H_2SO_4$ soak (525 of 855 mg; 61.4%); the extraction phase (20 bed volumes) only recovered a further 27 mg (3.2%). In contrast, the majority of Cr (318 of 855 mg; 37.2%) was recovered from the $H_2SO_4$ extraction phase (20 bed volumes) during Trial 2. For Trial 3, a similar proportion of Cr was recovered following the static $H_2SO_4$ soak (452 of 742 mg; 60.9%) compared to the recirculating approach (Trial 1), however, the following wash phase recovered 232 mg of Cr (31.3%) (FIG. 8). Further extraction and washing of the woodchips recovered only 7.1 mg of Cr (1.0%). Residual Cr in woodchips at the end of the treatment process was significantly lower (P<0.05) in Trial 3 (273±6.9 mg $kg^{-1}$; n=5) compared to Trials 1 (306±22.5 mg $kg^{-1}$) and 2 (1173±109 mg $kg^{-1}$). Analysis of residual Cr speciation post-leaching Trial 3 indicated that Cr was present as Cr in the III oxidation state.

TABLE 2

| Phase | Solvent | Volume added | Time (h) | Solvent recovered (L) |
|---|---|---|---|---|
| Soak | $H_2SO_4$ | 2.0 L | 24 | 1.19 |
| Wash | water | 10 bed volumes | 5 | 9.09 |
| Extraction | $H_2SO_4$ | 10 bed volumes | 5 | 9.34 |
| Wash | water | 10 bed volumes | 5 | 9.40 |

Weight difference in wood chips following extraction and drying: 663 g.

Figure 9:
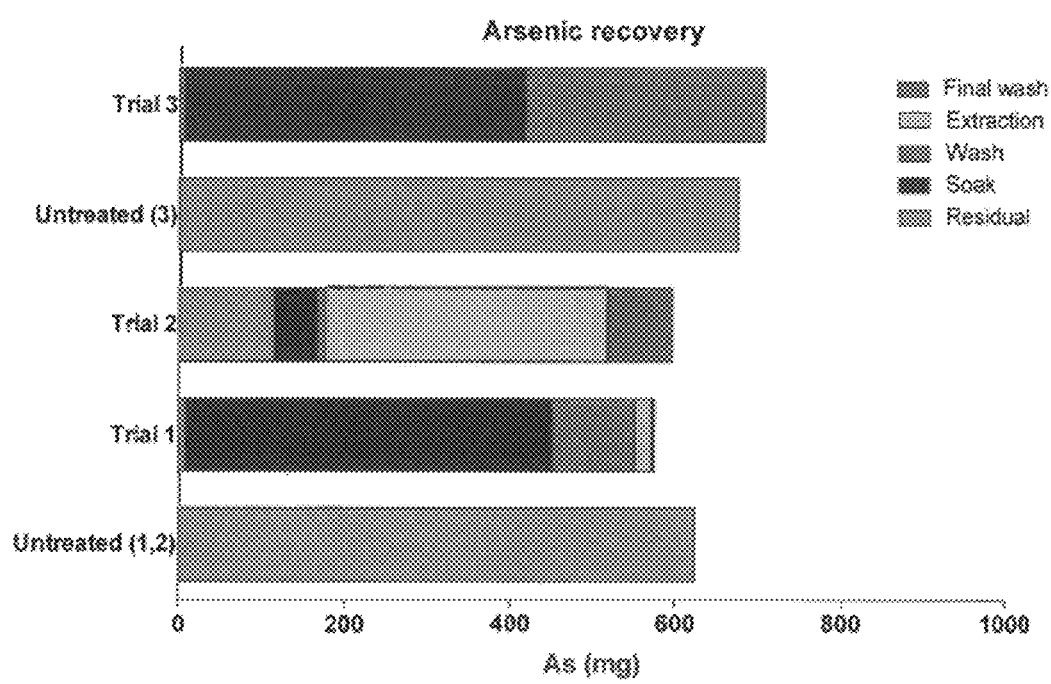
FIG. 9 is a graphical representation of the recovery of As from CCA leaching trial 1 ($H_2SO_4$ soak) and trial 2 ($H_2O_2$ soak) using a recirculating system and trial 3 using a static soak and flow through wash/extraction.

A total mass of 643 mg of As was present in 350 g of wood chips. This value was slightly higher (676 mg) for trial 3. In Trial 1, the majority of As was recovered during the $H_2SO_4$ soak (440 of 643 mg; 65.5%); the extraction phase (20 bed volumes) only recovered a further 20 mg (3.1%). In contrast, the majority of As (342 of 643 mg; 53.2%) was recovered from the $H_2SO_4$ extraction phase (20 bed volumes) during Trial 2. For Trial 3, a lower proportion of As was recovered following the static $H_2SO_4$ soak (410 of 676 mg; 60.7%) compared to the recirculating approach (Trial 1), however, the following wash phase recovered 288 mg of As (42.6%). Further extraction and washing of the woodchips recovered only 1.3 mg of As (0.2%). Residual As in woodchips at the end of the treatment process was similar between Trials 1 (26.0±1.5 mg $kg^{-1}$; n=5) and 3 (18.1±9.9 mg $kg^{-1}$) but significantly lower (P<0.05) compared to Trial 2 (330±59.4 mg $kg^{-1}$) (FIG. 9).

Figure 10:
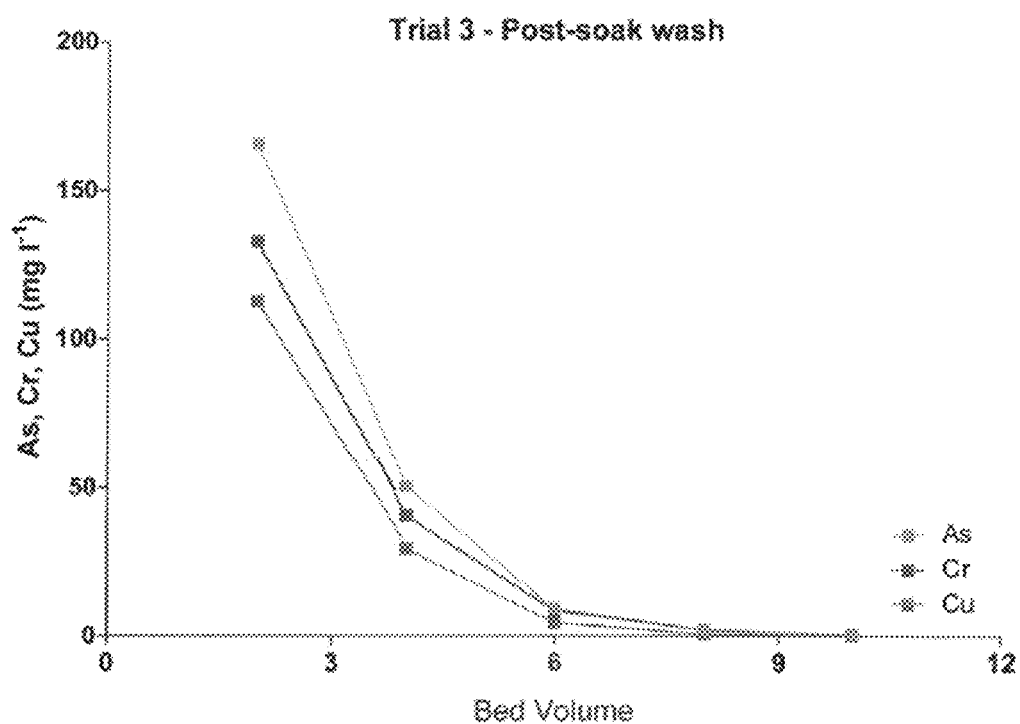
FIG. 10 is a graphical representation of the change in effluent corresponding to As, Cr and Cu concentrations during the 10 bed volume wash phase post $H_2SO_4$ static soak.
Figure 11:
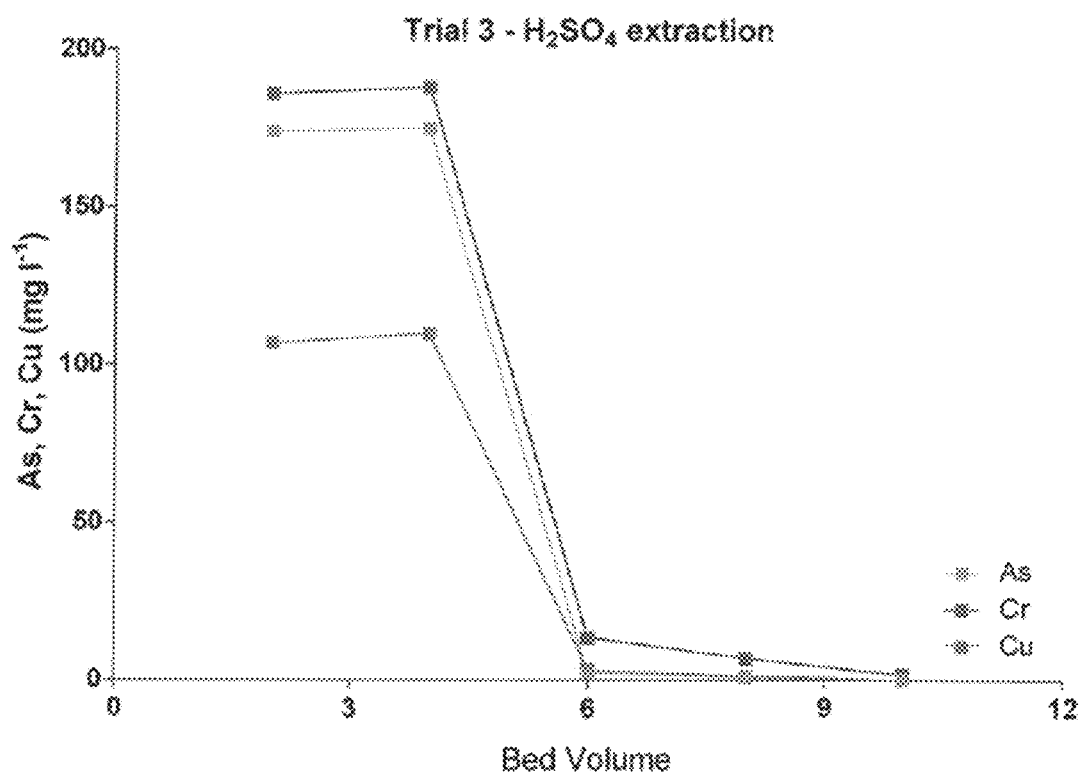
FIG. 11 is a graphical representation of the change in effluent corresponding to As, Cr and Cu concentrations during the 10 bed volume $H_2SO_4$ extraction phase.
Figure 12:
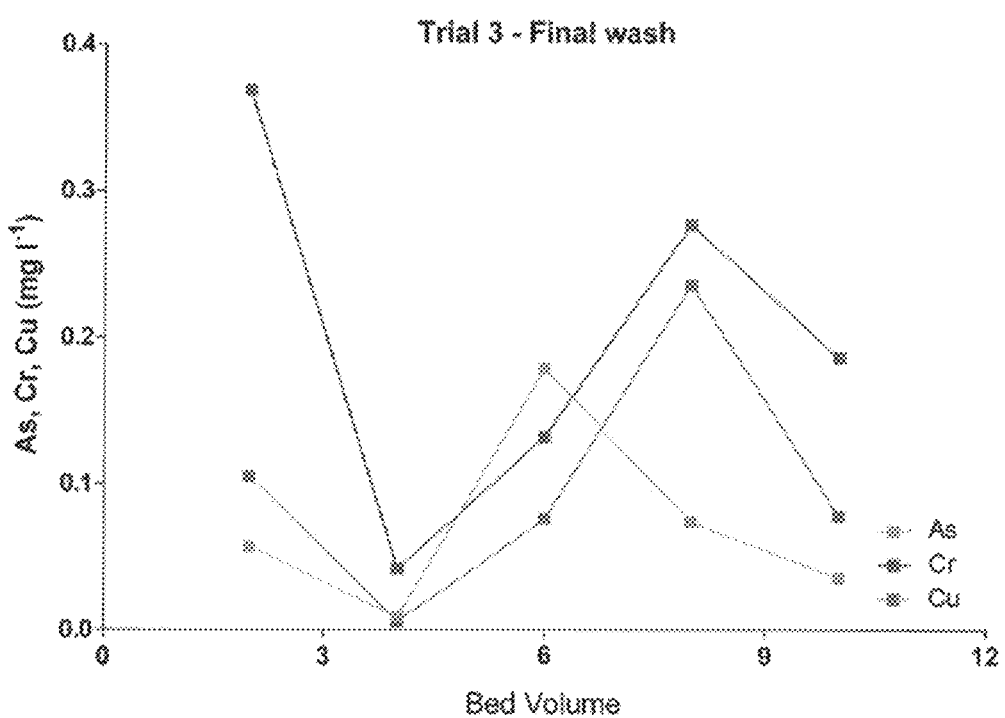
FIG. 12 is a graphical representation of the change in effluent corresponding to As, Cr and Cu concentrations during the 10 bed volume final water wash.

FIGS. 10-12 detail changes in effluent As, Cr and Cu concentration during the 10 bed volume wash phase post $H_2SO_4$ static soak (FIG. 10), $H_2SO_4$ extraction phase (FIG. 11) and final water wash (FIG. 12). Following the $H_2SO_4$ static soak, high effluent As, Cr and Cu concentrations were present following the initial 2 bed volume water wash (113-166 mg $L^{-1}$). This concentration was reduced to <10 mg $L^{-1}$ after 6 bed volumes and <2.3 mg $L^{-1}$ after 8 bed volumes. This indicates that the majority of As, Cr and Cu, associated with residual $H_2SO_4$ in woodchips could be removed after ~8 bed volumes of water. During the extraction phase, high As (175 mg $L^{-1}$), Cr (187 mg $L^{-1}$) and Cu (108 mg $L^{-1}$) concentrations were associated with the first $4H_2SO_4$ extraction bed volumes. This was reduced significantly (P>0.05) when additional $H_2Sat$ extraction bed volumes were applied to the column (e. g. 2.3, 13.3 and 1.3 mg $L^{-1}$ of As, Cr and Cu respectively after 6 bed volumes), indicating there is little benefit in applying the extraction phase past 6 bed volumes. During the final water wash, low effluent As, Cr and Cu concentrations (<0.4 mg $L^{-1}$) were observed over the 10 bed volumes applied Conclusions As demonstrated in trials 1-3, Cu, Cr and As could be removed from treated timber with varying efficacies depending on extraction parameters and pre-extraction soak solutions. Removal of Cu, Cr and As was achieved when 2% $H_2SO_4$ was utilized as the soak solution (utilizing a recirculating approach or a static soak) and with pre-treating CCA timber woodchips with 5% $H_2O_2$. Trial 3 demonstrated that an extraction phase following the 2% $H_2SO_4$ soak (24 h) and subsequent water wash increased Cu, Cr and As recovery. Residual concentrations of Cu and As post treatment (trials 1 and 3) were <20 mg $kg^{-1}$, however, residual Cr was 306 mg $kg^{-1}$ (Trial 1) and 273 mg $kg^{-1}$ (Trial 3).

Counter Current Extraction Pilot Trials

10 CCA extraction trials (table 3) were carried out which was modified from a 6 hour to a 5 hour product feed & 6 hour running time schedule on each trial. 4 relevant samples were taken from each trial, starting at the end of the first 2 hours which eliminated any discrepancies in the start-up or loading stage of the CCE extraction process.

TABLE 3

Summary of pilot trials 1 to 10.

Figure 13:
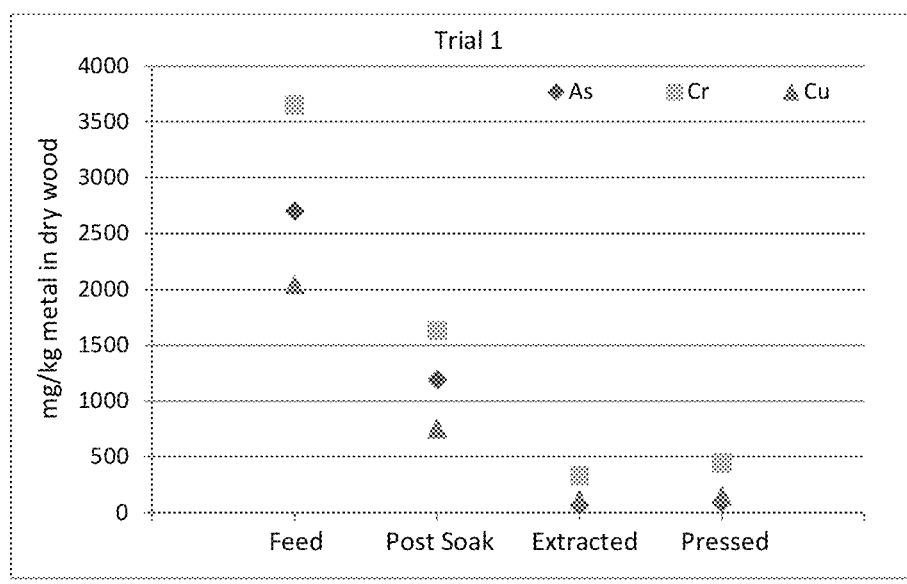
FIG. 13 is a graph showing copper, chromium and arsenic levels in various extracts at various stages of timber remediation in pilot Trial 1.
Figure 14:
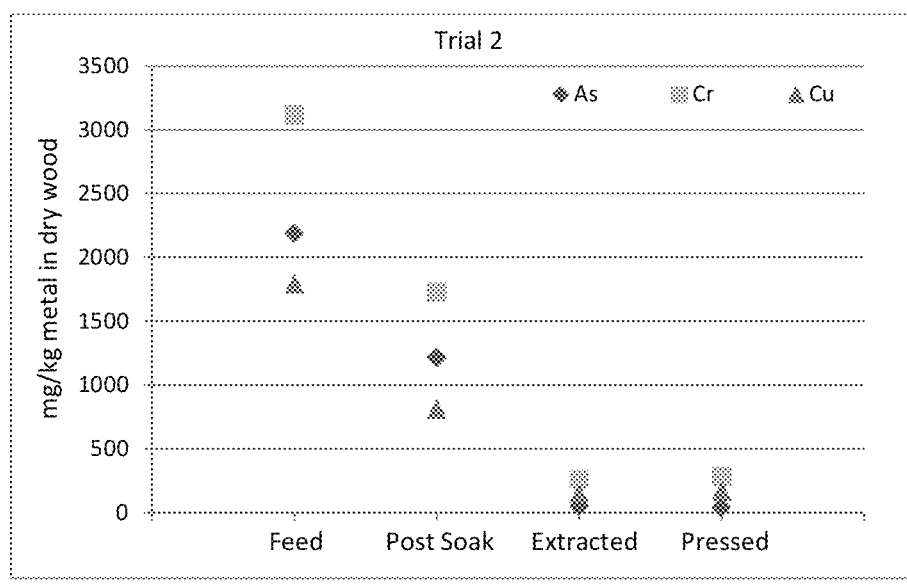
FIG. 14 is a graph showing copper, chromium and arsenic levels in various extracts at various stages of timber remediation in pilot Trial 2.
Figure 15:
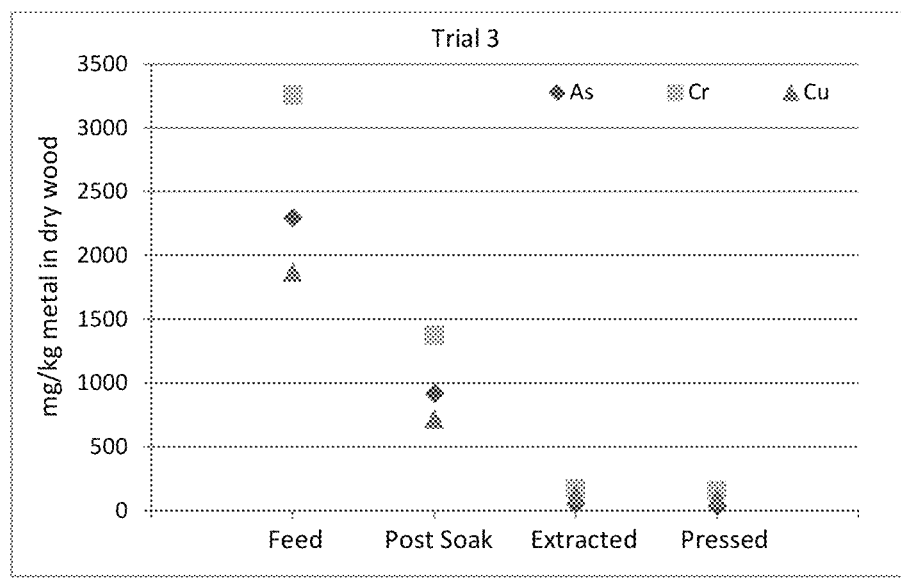
FIG. 15 is a graph showing copper, chromium and arsenic levels in various extracts at various stages of timber remediation in pilot Trial 3.
Figure 16:
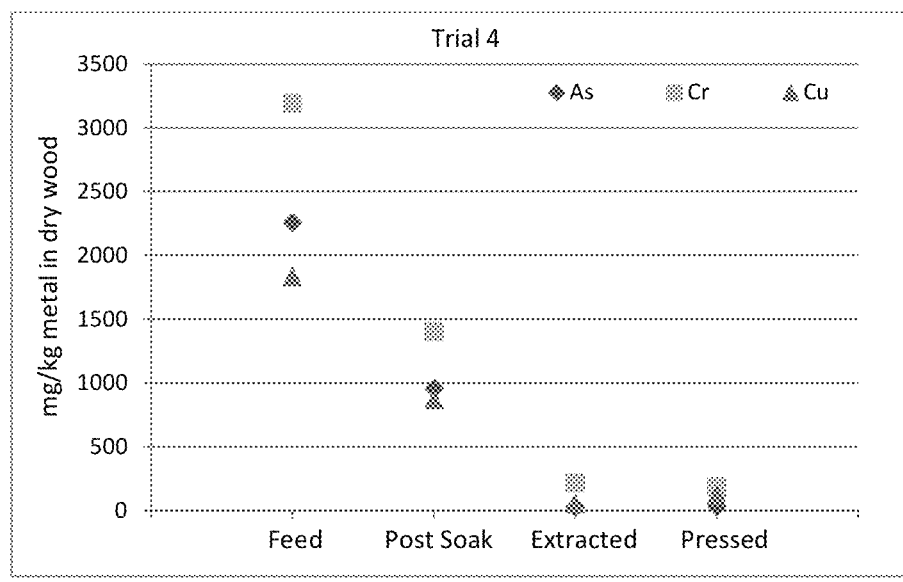
FIG. 16 is a graph showing copper, chromium and arsenic levels in various extracts at various stages of timber remediation in pilot Trial 4.
Figure 17:
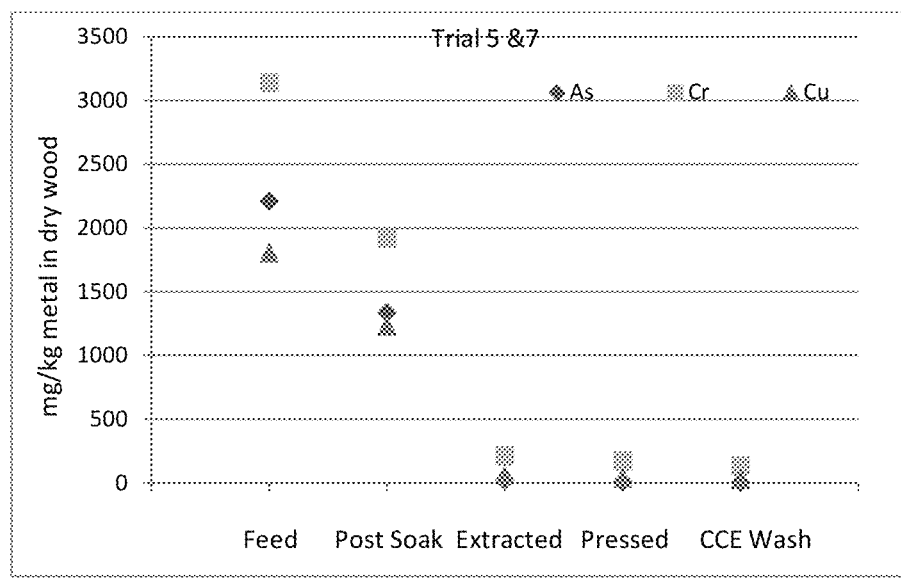
FIG. 17 is a graph showing copper, chromium and arsenic levels in various extracts at various stages of timber remediation in pilot Trials 5 and 7.
Figure 18:
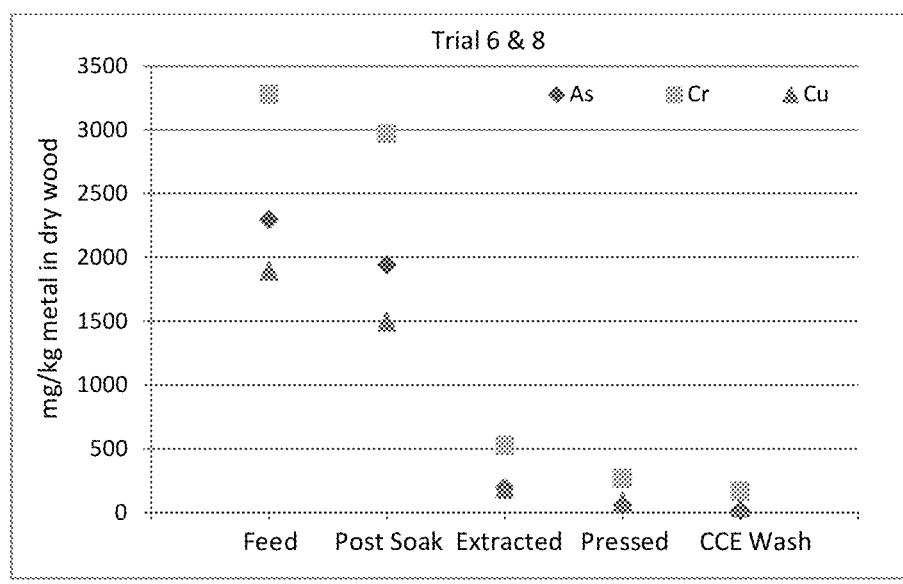
FIG. 18 is a graph showing copper, chromium and arsenic levels in various extracts at various stages of timber remediation in pilot Trials 6 and 8.
Figure 19:
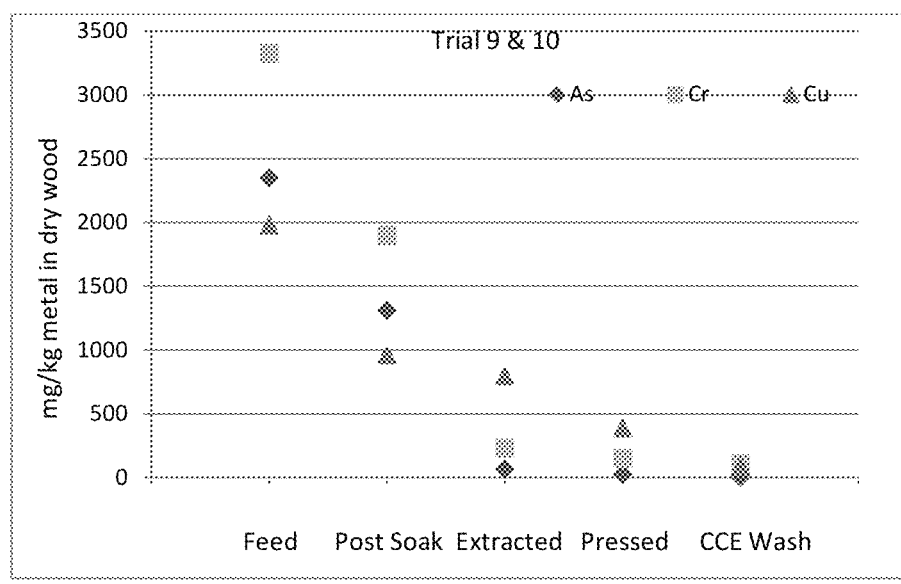
FIG. 19 is a graph showing copper, chromium and arsenic levels in various extracts at various stages of timber remediation in pilot Trials 9 and 10.

| Pilot Trial 1 | 2% $H_2SO_4$ soak @ 50° C. for 24 hours Water as CCE solvent, draft 2:1 | FIG. 13 |
|---|---|---|
| Pilot Trial 2 | 2% $H_2SO_4$ soak @ 50° C. for 12 hours Water as CCE solvent, draft 2:1 | FIG. 14 |
| Pilot Trial 3 | 2% $H_2SO_4$ soak @ 50° C. for 12 hours 2% $H_2SO_4$ as CCE solvent, draft 2:1 | FIG. 15 |
| Pilot Trial 4 | 2% $H_2SO_4$ soak @ 50° C. for 12 hours 2% $H_2SO_4$ as CCE solvent, draft 4:1 | FIG. 16 |
| Pilot Trial 5 | 2% $H_2SO_4$ soak @ 80° C. for 12 hours 2% $H_2SO_4$ as CCE solvent, draft 2:1 | FIG. 17 |
| Pilot (trial 7) | Water as CCE wash solvent, draft 4:1 | FIG. 17 |
| Pilot Trial 6 | 2% $H_2SO_4$ soak @ 80° C. for 24 hours 2% $H_2SO_4$ as CCE solvent, draft 4:1 | FIG. 18 |
| Pilot (trial 8) | Water as CCE wash solvent, draft 2:1 | FIG. 18 |
| Pilot Trial 9 | 2% $H_2SO_4$ soak @ 80° C. for 24 hours 2% $H_2SO_4$ + 1% $H_2O_2$ as CCE solvent, draft 4:1 | FIG. 19 |
| Pilot (trial 10) | 1% $H_2O_2$ as CCE wash solvent, draft 4:1 | FIG. 19 |

The constant operating parameters are the extraction Residence Time, the Extractor Angle, the Product Feed Rate and the Soak and Solvent Concentration of sulphuric acid.

The variable operating parameters are the Soaking Time, Soaking Temperature, Extraction Solvent and Draft.

CCA Treated Timber

The CCA timber as vineyard posts were supplied as approximately 30 to 40 posts from a vineyard. The posts were approximately 1.8 m long by 75 mm diameter in size. The expected service life for the posts was around 8 years in the area due to rot and other issues.

Chipping and Particle Size

Chipping of dry vineyard post material generated a particle size around 4 mm accompanied by a significant amount of dust. Wetting of this material increased the particle size significantly (including dust particles). The resultant combination was important to provide the necessary "resistance to flow" to the solvent counterflowing the particles.

Soaking

Soaking of the chips was carried out over typically 15 hours using heated solvent (50° C. and 80° C.) to experimentally determine the effects of temperature. The solvent was circulated throughout the soaking step.

Mass Density

Dry weight of the chips=236 g per litre

Wet weight of the chips=457 g per litre

CCE Operation

Trials were conducted using a pilot CCE model 200, load capacity for this model ranges from 3 kg/hr to 10 kg/hr of dry feed assuming a residence time between 60 to 80 minutes.

a. Draft (liquid/solid) for solvent extraction 2:1 b. Draft (liquid/solid) for washing 4:1

Recycle of extract to heat incoming feed material was at 50° C.

Solvent 2% sulphuric acid maintained at 50° C.

Extracted Solids

The mass density of the extracted solids=475 g per litre compared with the dry weight of the chips=236 g per litre the difference of 239 g Pressed Solids The weight reduction of the extracted solids from CCE after pressing ranged from 51% to 62% or an average of 56% and an average of 44% of the liquid returned back into the process.

Further Treatment of Extracts

One or more of the extracts generated from the timber remediation method, such as the acidic extract, oxidative extract, soak extract, wash extract, or combinations thereof which comprise copper, chromium or arsenic metal species can be subject to steps to recover and reuse such metal species.

Removal of Residual Organic Compounds

Organic residues which include organic particulates, colloidal materials and/or color can contribute to fouling of many filtration devices. As such, several powdered activated carbon (PAC) treatments were examined as a treatment to remove some of the residues. The PACs examined were;

1. Calgon Carbon DCL 320 (wood acid washed PAC);
2. James Cumming and Sons MDW3545CB (coal PAC); and
3. Oxbow Filchem (coal PAC) >85% color removal.

It will be appreciated that several treatments of any combination of PACs can be used. The tests were performed by dosing a known amount of PAC into 200 mL (target 2.5-17.5 g PAC/L for working liquor). The mixture was continuously stirred to ensure that the PAC was fully suspended and well mixed. The tests were conducted at a controlled temperature 23±1° C. and the samples were covered to minimize evaporation losses. Representative samples were taken at t=0, t=1 hr and t=24 hrs and PAC treated samples were filtered immediately using a 0.45 μm filter to separate the PAC from the solution.

The samples were then analyzed for detailed characterization for color, chemical oxygen demand (COD), total organic carbon (TOC) and metals. A control sample of PAC in 2% aqueous sulphuric acid was also included to assess if any contaminants were leached out from the PAC. The control showed that some iron and calcium was leached out from the PAC into the 2% Sulphuric acid.

In general, the isothermal study of PAC revealed that among three different PACs were tried Calgon Carbon DCL 320 and James Cumming and Sons MDW3545CB PACs showed 67-70% color removal at 7.5 g PAC/L liquor and could effectively remove color (large organic, tannins).

Removal of Suspended Solids

A filtration trial was conducted for the combined extract liquid having a pre-treatment of PAC at 2.5 g/L.

The filtrate and concentrate samples were collected and analysed for physico-chemical properties as well as volatile fatty acid analysis. The detailed characterization and metal content in raw liquid, filtrate and concentrate as well as the volatile aid analysis are presented in Table 4 & 5.

TABLE 4

General characteristics of raw feed, filtrate and concentrate

| Parameters | Unit | Raw feed | PAC treatment | |
| --- | --- | --- | --- | --- |
| | | | Permeate | Concentrate |
| TDS | mg/L | 45890 | 41490 | 40290 |
| Volatile DS | mg/L | 42310 | 38000 | 32890 |
| Colour true | PCU | 1644 | 596 | 562 |
| Soluble COD | mg/L | 24967 | 18500 | 19200 |
| pH | | 0.60 | 0.89 | 0.83 |
| EC | mS/cm | 100 | 94 | 99 |
| TOC | mg/L | 7380 | 6560 | |
| Tannins | mg/L | 476 | 274 | 280 |
| TVA* | mg/L | 2050 | 1940* | 1910 |
| ORP | mV | 361 | 422 | 417 |

*Total Volatile acid - 40% as formic acid; 50% as acetic acid and <10% as larger organic acid

TABLE 5

General characteristics of raw feed, filtrate and concentrate

| Metals (mg/kg) | Raw feed | PAC treatment | |
| --- | --- | --- | --- |
| | | Permeate | Concentrate |
| Aluminium | 15.9 | 14.6 | 20.70 |
| Arsenic* | 298* | 321* | 320 |
| Barium | 0.194 | 0.24 | 0.064 |
| Chromium | 483 | 432 | 381 |
| Cobalt | 0.026 | 0.068 | 0.028 |
| Copper | 347 | 269 | 279 |
| Lead | 2.52 | 0.01 | 0.014 |
| Manganese | 0.60 | 3.02 | 2.907 |
| Nickel | 1.20 | 1.13 | 1.392 |
| Strontium | 46 | 1.49 | 1.57 |
| Zinc | 84 | 36 | 25.2 |
| Iron | 24 | 82 | 60.40 |
| Silicon | 15.9 | 20 | 21.84 |
| Calcium | 124 | 182 | 161 |
| Magnesium | 42 | 62 | 34.99 |
| Sodium | 82 | 76 | 93 |
| Potassium | 38 | 34 | 33.36 |
| Sulfur | 8611 | 9140 | 8428 |
| Chloride | 46 | 42 | |
| $NO_3 + NO_2 - N$ | <0.1 | <0.1 | |

*>99% as As (V) - As (III), Monomethylarsonic, Dimethylarsenic acid and Arsenobetaine To separate any solids, including, the PAC from the extracts, microfiltration using hollow fiber organic polymer ultrafiltration (0.04 μm) or microfiltration using a polymeric metallic filter (0.05 μm) were done and the results showed that the ultrafiltration process was able to remove the PAC residue and colloidal material. The silt density index—15 (15 minutes plunging time) for the ultrafiltration filtrate was 1.9 and 3.2, for PVDF and AMS, respectively as presented in table 6. Concentration trial with nanofiltration (NF-90)

TABLE 6

Tabular results of micro- and ultra-filtration trials

| Trial | Sample | SDI |
| --- | --- | --- |
| 1 | 0.5 μm nominal | $SDI_5$ = 4.8 (poor) |
| 2 | 0.04 μm PVDF hollow fiber organic polymer | $SDI_{15}$ = 1.9 |
| 3 | 0.05 μm polymeric metallic filter | $SDI_{15}$ = 3.2 |

In general, it was revealed that the ultrafiltration processes trialed were able to produce a suitable liquor having a silt density index suitable for further processing.

Concentration

A nanofiltration concentration trial employing NF-90 membrane was performed using a combined extract, the chemical properties and metal content are presented in Tables 4 and 5.

The primary objective trial was to investigate the rejection of the CCA metals and the acid and to assess the recovery limit of this process. Prior to performing the concentration trial, the membrane was stabilized at the manufacturer's operating condition (4.8 bar, 2000 ppm $MgSO_4$).

Figure 22:
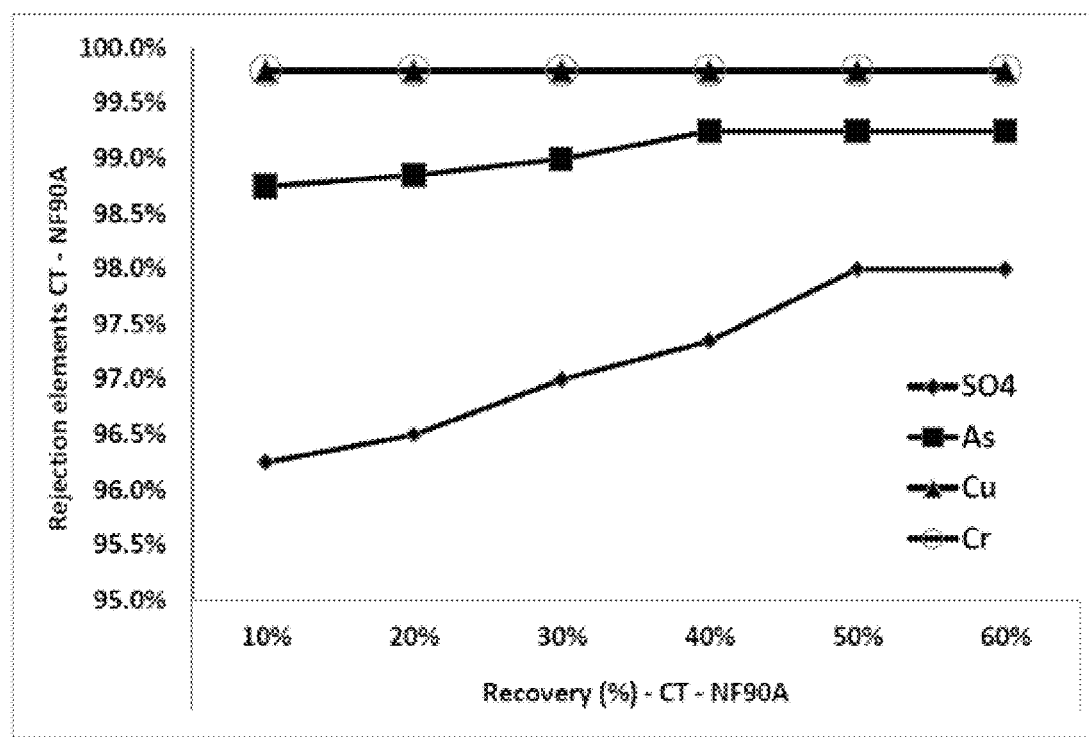
FIG. 22 is a graph showing rejection of Copper, Chromium, Arsenic and sulphuric acid during concentration of combined extracts. Light grey is overlaid copper and chromium, dark grey is arsenic and black is sulphuric acid.

In terms of ion passage, >99.8% of multivalent cations i.e. copper and chromium (including, other cations, aluminium, zinc and iron) were rejected as shown in FIG. 22 at 63% recovery. The NF-90 membrane was also able to reject >98.5% of arsenic acid based on size exclusion.

The composition of the cations/anions in the concentrate and permeate stream is tabulated in Table 7. The concentration of multivalent cations in permeate stream was relatively low. The concentration of chromium and copper was <0.2 mg/L. The concentration of non-charged arsenic acid in the permeate was <5 ppm at any recovery point. Some other multivalent cations such as iron, zinc and manganese were also present in relatively low concentration.

The composition of the cations/anions in the concentrate and permeate stream is tabulated in Table 7. The concentration of multivalent cations in permeate stream was relatively low. The concentration of chromium and copper was <0.2 mg/L. The concentration of non-charged arsenic acid in the permeate was <5 ppm at any recovery point. Some other multivalent cations such as iron, zinc and manganese were also present in relatively low concentration.

TABLE 7

Composition of concentrate and permeate stream (CT - NF90A)

|  | Concentrate |  | Permeate |  |
|---|---|---|---|---|
| Recovery % | 50 | 63 | 50 | 63 |
| pH | 0.39 ± 0.07 | 0.11 ± 0.01* | ~1.36 | 1.3 ± 0.2 |
| Cations (mg/L) | | | | |
| Al | 38.17 | 54.64 | 0.02 | 0.02 |
| As | 587 | 863 | 3.75 | 4.82 |
| Ca | 436 | 629 | 0.11 | 0.11 |
| Cr | 749 | 1079 | 0.14 | 0.15 |
| Cu | 540 | 780 | 0.11 | 0.11 |
| Fe | 108 | 147 | 0.08 | 0.07 |
| K | 70 | 96 | 0.09 | 0.14 |
| Mg | 109 | 156 | 0.02 | 0.05 |
| Mn | 5.40 | 7.35 | 0.00 | 0.00 |
| Na | 210 | 293 | 0.23 | 0.29 |
| Ni | 2.61 | 3.56 | 0.02 | 0.02 |
| Si | 33.25 | 45.13 | 0.32 | 0.35 |
| Sr | 2.91 | 4.00 | 0.02 | 0.02 |
| Zn | 41.08 | 53.64 | 0.38 | 0.47 |
| Anion (mg/L) | | | | |
| Cl | — | — |  | <120 |
| $NO_3 + NO_2$ | — | — |  | <0.3 |
| S (measured) | 14150 | 20077 | 256 | 330 |
| S (Calculated) | 42877 | 60838 | 776 | 999 |
| Organic (mg/L) | | | | |
| COD | 37300 | 54100 |  | 1560 |
| Color (True) |  | 2446 |  | 0 |

In terms of dissolved organic material, 97% of the dissolved organic compound was rejected (COD measurement). The large tannins molecule (colour) was completely rejected, whilst large organic compound was highly rejected, low MW volatile acids (<90 Da) were permeated to some extent.

Based on a mass balance of organic compounds the organic fouling deposition on the membrane was minimal. At the end of the trial, the concentration factor for COD and colour was 2.7× which was expected at 63% recovery. The results of concentration trial also show that using a nanofiltration membrane (NF-90) the rejection of CCA metals was high, with >99% rejection of copper and chromium and >98% rejection of arsenic. The concentration of copper, chromium in the permeate stream is <0.2 mg/L while arsenic is <5 mg/L.

Example Process 1

The invention is now described in relation to a particular embodiment:

CCA timber is provided and treatment to remove building materials such as metal staples, nails and the like. The CCA timber is milled, preferably having particle dimensions which provide a longest dimension suitable for use in particle board manufacture (5 mm) and particle dimension provides one short dimension (2 mm).

The milled timber is subject to a soaking step, preferably in an acidic, oxidative solvent, or mixtures thereof, to allow contact between solvent and the milled timber which allows wetting of the timber (uptake of own weight in solvent). This step initiates the breaking of the bond between chromium, copper, arsenic to the timber. Most preferably this step is conducted at a temperature of about 80° C. The soaking step may be either a batch process or use CCE. This step provides a soak extract.

A first counter current stage uses a very efficient diffusion extractor used to remove and recover metals using an acidic solvent or an oxidative solvent $H_2O_2$. The solid and liquid phases move counter current. This is a multistage device (10-14 mathematical stages). This device is fitted with specially designed paddles which ensure effective contact between solid and counter flowing liquid. The CCE1 has 8 important operating variables each of which are required to maintain effective transfer of metals from solid to liquid phase. Preferably the temperature to be maintained at 80° C.

A second stage uses the extracted chips from CCE1 which are transferred to CCE2 where they counter-flow against water in order to wash out the residual metals and acidic or oxidative solvents. The wash water consists of a combination of water returned from the reverse osmosis and dryer plus make up water (environmental).

The makeup water equates to the water used to maintain the metals in solution. Preferably hydrogen peroxide is added to the wash water to maintain extracted chromium as Cr in the VI oxidation state. The washed chips can be discharged into a press. The press extract (which contains a low level of residual metals and solvent) is returned to the CCE2 at a point where the concentration of metals in the press liquor exceeds the concentration in the liquid phase CCE2 and in their way become part of the recovery. Press liquor equates to half the weight of the solid phase leaving CCE1.

The skilled person will understand that the mixtures of oxidative and/or acidic solvents, whether sequentially or simultaneously applied can destabilise the bond between chromium and the timber, and the bonds locking copper and arsenate to the chromium. Furthermore, the solvents can solubilize the metals. It will be appreciated 2% $H_2SO_4$ and 5% $H_2O_2$ are preferred.

It will further be appreciated that CCE device which has the theoretical capability to separate the solubilized metals from the wood with the required efficiency (99%). Such a device needed to be multistage or alternatively use solvent/wood ratio of 100/1. Preferably this method enables the remediated timber can be discharged such that it can be recycled. Preferably this method further allows the recovered metals that can be recycled for use in the production of new treated timber products.

Example Process 2

Figure 20:
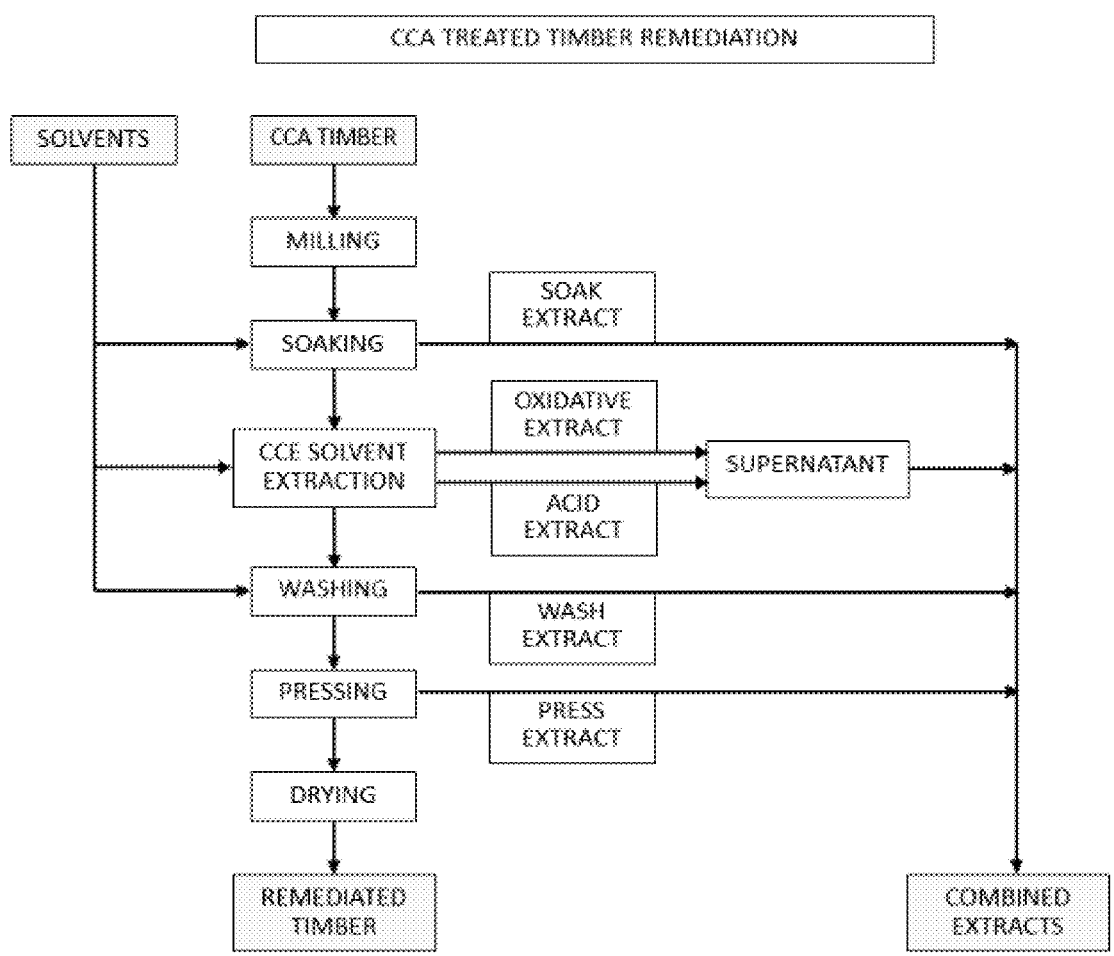
FIG. 20 is a schematic representation of a particular embodiment of the invention in relation to the method of timber remediation.

The invention is now described in relation to a particular embodiment, as shown in FIGS. 20 and 21:

CCA timber is provided and optional treatment to remove building materials such as metal staples, nails and the like may be applied as necessary. The CCA timber is milled, preferably being milled to at least one minimum dimension of 1 to 5 mm, preferably about 2 mm.

The milled timber is subject to a soaking step, preferably in an acidic, oxidative solvent, or mixtures thereof, to allow contact between solvent and the milled timber which allows wetting of the timber (uptake of own weight in solvent). This step initiates the breaking of the bond between chromium, copper, arsenic to the timber. Most preferably this step is conducted at a temperature of about 80° C. The soaking step may be either a batch process or use CCE. This soaking step provides a soak extract.

A first counter current stage uses a very efficient diffusion extractor used to remove and recover metals using at least one of an acidic solvent (preferably 2% $H_2SO_4$) or an oxidative solvent (preferably 1% $H_2O_2$) (or combination of both acid and oxidant simultaneously) providing the acidic and oxidative extracts respectively. The solid and liquid phases move counter current. This is a multistage device (10-14 mathematical stages). This device is fitted with specially designed paddles which ensure effective contact between solid and counter flowing liquid. The CCE1 has 8 important operating variables each of which are required to maintain effective transfer of metals from solid to liquid phase. Preferably the temperature to be maintained at 80° C. The combined extracts are designated the supernatant, which contains the extracted chromium, copper and arsenic.

A second stage uses the extracted chips from CCE1 which are transferred to CCE2 where they counter-flow against water in order to wash out the residual metals and acidic or oxidative solvents, providing the wash extract. The wash water consists of a combination of water returned from the reverse osmosis and dryer plus make up water (environmental). This process can also be performed in batch.

The makeup water equates to the water used to maintain the metals in solution. Preferably hydrogen peroxide is added to the wash water to maintain extracted chromium as Cr in the VI oxidation state. The washed chips can be discharged into a press. The press extract (which contains a low level of residual metals and solvent) is returned to the CCE2 at a point where the concentration of metals in the press liquor exceeds the concentration in the liquid phase CCE2 and in their way become part of the recovery. Press liquor equates to half the weight of the solid phase leaving CCE1. The pressed timber can be subject to a further step of drying.

The skilled person will understand that the mixtures of oxidative and/or acidic solvents, whether sequentially or simultaneously applied can destabilise the bond between chromium and the timber, and the bonds locking copper and arsenate to the chromium. Furthermore, the solvents can solubilize the metals. It will be appreciated 2% $H_2SO_4$ and 1% $H_2O_2$ are preferred.

The combined extracts as described above and shown in FIG. 20, comprise one or more of CCA metals, organic compounds, minerals derived from the timber and sulphuric acid were then subject to further the sequential steps of a) at least partial removal of residual organic compounds by addition of activated carbon; b) at least partial removal of suspended solids by ultrafiltration (0.05 μm pore size); and c) at least partial concentration by nanofiltration (90 Da pore size), evaporation, dense-membrane filtration, reverse osmosis or a combination thereof, to produce a CCA containing liquid (FIG. 21). The CCA containing liquid can be as a feed stock used to preserve timber.

What is claimed is:

1. A method of chromated copper arsenate (CCA) treated timber remediation, the method comprising:
   contacting the CCA timber with an acidic solvent to provide an acidic extract;
   contacting the CCA timber with an oxidative solvent to provide an oxidative extract and obtain a treated timber;
   separating the treated timber from the oxidative extract and acidic extract to produce a supernatant;
   washing the treated timber with water to obtain a washed timber and a wash extract; and
   pressing the washed timber with a solvent to obtain a remediated timber and a press extract,
   wherein one or more of the steps is conducted using continuous counter current extraction (CCE),
   wherein the acidic solvent is an aqueous mineral acid,
   wherein contacting the CCA timber with the acidic solvent or contacting the CCA timber with the oxidative solvent is performed simultaneously,
   wherein separating the oxidative extract and the acidic extract from the contacted timber is performed simultaneously,
   wherein the press extract is returned to said washing when a concentration of a metal in the press extract exceeds a concentration of a metal in the wash extract, and
   wherein said washing comprises adding a neutralizing solution which is carbonate or bicarbonate, and said washing is conducted under a neutralizing condition such that a residual acid in the treated timber is neutralized.

2. The method of claim 1, further comprising:
   soaking the CCA timber with a solvent to provide a soak extract.

3. The method of claim 1, wherein an aqueous mineral acid is aqueous $H_2SO_4$.

4. The method of claim 1, wherein the oxidative solvent has an oxidizing potential suitable to oxidize chromium to a VI oxidation state.

5. The method of claim 1, wherein the CCE has a residence time, a screw timing and feed rate sufficient to remove a predetermined amount of chromated copper arsenate.

6. The method of claim 1, wherein the CCA timber is milled.

7. The method of claim 1, further comprising soaking the CCA timber with a solvent to provide a soak extract,
   wherein said washing provides a wash extract, wherein one or more of the supernatant, the acidic extract, the oxidative extract, the soak extract, the wash extract, or combinations thereof is subjected to one of more of the further steps:
   a) at least partial removal of residual organic compounds; or
   b) at least partial removal of suspended solids,
   to produce a CCA containing liquid.

8. The method of claim 1, wherein said washing is conducted at a temperature of up to 80° C.

9. The method of claim 1, wherein the water comprises water returned from a reverse osmosis.

10. The method of claim 1, wherein the press extract is returned to said washing when a concentration of copper in the press extract exceeds a concentration of copper in the wash extract.

11. The method of claim 1, wherein the press extract is returned to said washing when a concentration of chromium in the press extract exceeds a concentration of chromium in the wash extract.

12. The method of claim 1, wherein the press extract is returned to said washing when a concentration of arsenic in the press extract exceeds a concentration of arsenic in the wash extract.

13. The method of claim 2, wherein the soak extract is separated from the soaked timber.

14. The method of claim 2, wherein the CCA timber is soaked in the acidic solvent, the oxidative solvent or mixtures thereof.

15. The method of claim 2, wherein said soaking is conducted using continuous counter current extraction.

16. The method of claim 2, wherein the contacting with the oxidative solvent, the contacting with the acidic solvent, or the soaking is conducted at a temperature of up to 80° C.

17. The method of claim 3, wherein the aqueous $H_2SO_4$ is at a concentration of up to 20% w/v.

18. The method of claim 4, wherein the oxidative solvent is an aqueous oxidant.

19. The method of claim 6, wherein the timber is milled to at least one minimum dimension of 1 mm to 5 mm.

20. The method of claim 7, wherein the residual organic compounds are at least partially removed by addition of activated carbon, or the suspended solids are at least partially removed by ultrafiltration.

21. The method of claim 7, further comprising using the CCA containing liquid as a feedstock to treat timber for preservation.

22. The method of claim 17, wherein the aqueous $H_2SO_4$ is at a concentration of up to 2% w/v.

23. The method of claim 18, wherein the aqueous oxidant is $H_2O_2$.

24. The method of claim 23, wherein $H_2O_2$ is present in up to a concentration of 20% w/v.

25. The method of claim 24, wherein $H_2O_2$ is present in up to a concentration of 0.2% to 1% w/v.

* * * * *